(12) United States Patent
Hirakata

(10) Patent No.: US 7,209,110 B2
(45) Date of Patent: Apr. 24, 2007

(54) ACTIVE MATRIX TYPE DISPLAY DEVICE

(75) Inventor: Yoshiharu Hirakata, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 136 days.

(21) Appl. No.: 10/863,271

(22) Filed: Jun. 9, 2004

(65) Prior Publication Data

US 2004/0222962 A1    Nov. 11, 2004

Related U.S. Application Data

(62) Division of application No. 09/120,241, filed on Jul. 22, 1998, now Pat. No. 6,750,838.

(30) Foreign Application Priority Data

Jul. 24, 1997   (JP) .................................. 9-216015

(51) Int. Cl.
   *G09G 3/36*   (2006.01)
(52) U.S. Cl. .......................... 345/98; 345/560
(58) Field of Classification Search ................ 345/558, 345/560, 536, 103, 98
   See application file for complete search history.

(56) References Cited

U.S. PATENT DOCUMENTS

| 4,720,744 A | * | 1/1988 | Washi et al. ................. 348/469 |
| 5,043,714 A | | 8/1991 | Perlman |
| 5,168,270 A | | 12/1992 | Masumori et al. |
| 5,192,945 A | | 3/1993 | Kusada |
| 5,196,738 A | | 3/1993 | Takahara et al. |
| 5,457,482 A | | 10/1995 | Rhoden et al. |
| 5,543,824 A | | 8/1996 | Priem et al. |
| 5,574,475 A | | 11/1996 | Callahan, Jr. et al. |
| 5,585,816 A | | 12/1996 | Scheffer et al. |
| 5,598,180 A | | 1/1997 | Suzuki et al. |
| 5,643,826 A | | 7/1997 | Ohtani et al. |
| 5,648,277 A | | 7/1997 | Zhang et al. |
| 5,771,031 A | | 6/1998 | Kinoshita et al. |
| 5,801,674 A | | 9/1998 | Shimizu |
| 5,907,313 A | | 5/1999 | Kubota et al. |
| 5,923,962 A | | 7/1999 | Ohtani et al. |
| 5,949,397 A | | 9/1999 | Koyama et al. |
| 6,037,925 A | * | 3/2000 | Kim ............................ 345/99 |
| 6,219,022 B1 | | 4/2001 | Yamazaki et al. |
| 6,421,041 B2 | | 7/2002 | Yamazaki et al. |
| 6,590,562 B2 | | 7/2003 | Yamazaki et al. |

(Continued)

FOREIGN PATENT DOCUMENTS

JP        05-232898       9/1993

(Continued)

*Primary Examiner*—Ricardo Osorio
(74) *Attorney, Agent, or Firm*—Eric J. Robinson; Robinson Intellectual Property Law Office, P.C.

(57) ABSTRACT

In an active matrix type display device including two source line side drivers for driving a plurality of pixel TFTs, one gate line side driver, two line memories respectively including at least first and second memories, and a controller for controlling the first and second line memories, storing and transmitting of picture data of the two line memories are switched to transmit the data to the two source line side drivers at the same time.

20 Claims, 15 Drawing Sheets

U.S. PATENT DOCUMENTS

| | | | |
|---|---|---|---|
| 6,750,838 B1* | 6/2004 | Hirakata | 345/98 |
| 2001/0015714 A1 | 8/2001 | Yamazaki et al. | |
| 2002/0154089 A1 | 10/2002 | Yamazaki et al. | |

FOREIGN PATENT DOCUMENTS

| | | |
|---|---|---|
| JP | 7-130652 | 5/1995 |
| JP | 7-135318 | 5/1995 |
| JP | 07-181925 | 7/1995 |
| JP | 07-199864 | 8/1995 |
| JP | 8-078329 | 3/1996 |
| JP | 08-305325 | 11/1996 |

* cited by examiner

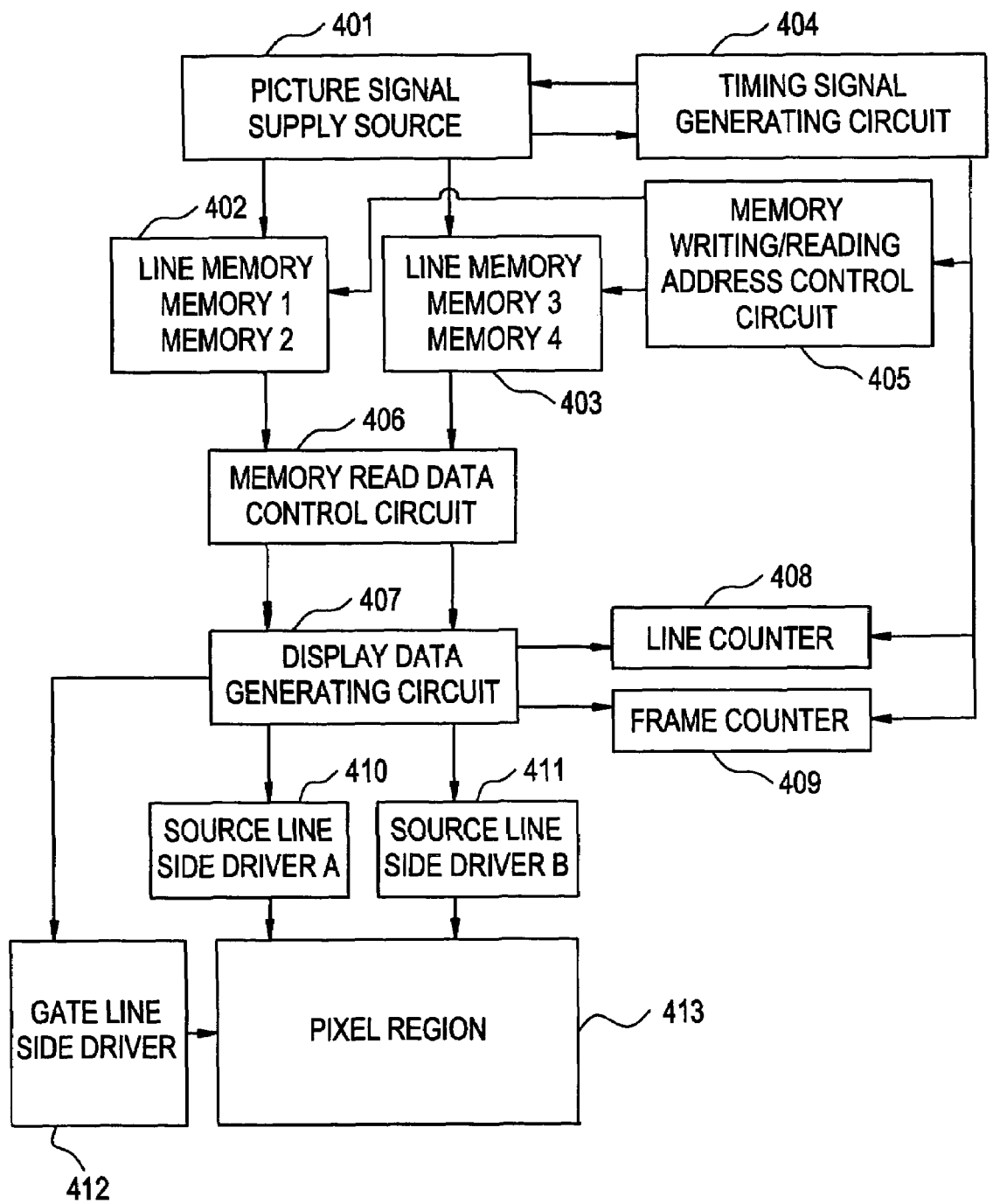

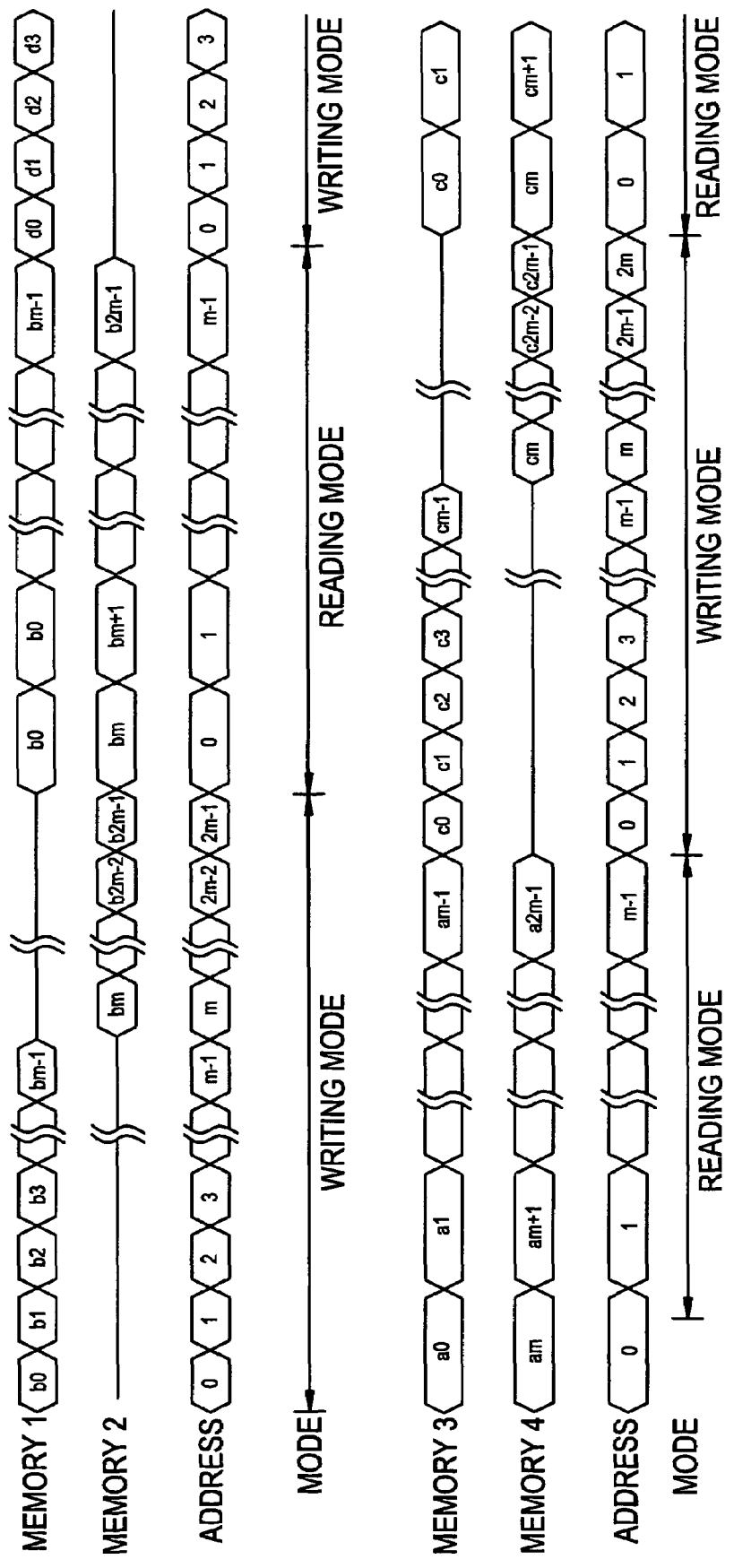

HEAT TREATMENT FOR CRYSTALLIZATION

GETTERING PROCESS OF CATALYTIC ELEMENT

ADDITION OF IMPURITY ION FOR GIVING N-TYPE
(FORMATION OF n⁻ REGION/ n⁺ REGION)

ADDITION OF IMPURITY ION FOR GIVING P-TYPE
(FORMATION OF p⁻ REGION/ p⁺ REGION)

CMOS CIRCUIT | PIXEL MATRIX CIRCUIT

CMOS CIRCUIT | PIXEL MATRIX CIRCUIT

ACTIVE MATRIX TYPE DISPLAY DEVICE

This application is a divisional of U.S. application Ser. No. 09/120,241, filed on Jul. 22, 1998, now issued as U.S. Pat. No. 6,750,838.

BACKGROUND OF THE INVENTION

1. Field of the Invention

The present invention relates to an active matrix type display device for making display of a large screen with high resolution.

2. Description of the Related Art

In recent years, a technique for manufacturing a semiconductor device in which a semiconductor film is formed on an inexpensive glass substrate, such as a thin film transistor (TFT), has been rapidly developed. The reason is that demand for an active matrix type liquid crystal display device (liquid crystal panel) has been increased.

The active matrix type liquid crystal panel is structured such that a TFT is disposed for each of several tens to several millions of pixel regions arranged in matrix, and an electric charge going in and out of the respective pixel electrodes is controlled by the switching function of the TFT.

FIG. 1 shows a conventional active matrix type liquid crystal display device. As shown in FIG. 1, the conventional active matrix type liquid crystal display device includes a source line side driver 101, a gate line side driver 102, a plurality of pixel TFTs 103 arranged in matrix, and a picture signal line 104.

The source line side driver and the gate line side driver respectively include a shift register, a buffer circuit and the like, and in recent years, they are monolithically formed on the same substrate as an active matrix circuit.

In the active matrix circuit, thin film transistors using amorphous silicon formed on a glass substrate are disposed.

There is also known a structure in which a thin film transistor is formed of a polycrystalline silicon film while quartz is used for a substrate. In this case, both a peripheral driving circuit and an active matrix circuit are constituted by thin film transistors formed on the quartz substrate.

There is also known a technique in which a thin film transistor using a crystalline silicon film is formed on a glass substrate by using a technique such as laser annealing. When this technique is used, an active matrix circuit and a peripheral driving circuit can be integrated on the glass substrate.

In the structure as shown in FIG. 1, a picture signal supplied to the picture signal line 104 is selected by a signal from the shift register circuit of the source line side driver (shift register for horizontal scanning). A predetermined picture signal is supplied to a corresponding source signal line.

The picture signal supplied to the source signal line is selected by a thin film transistor of a pixel and is written into a predetermined pixel electrode.

The thin film transistor of the pixel is operated by a selection signal supplied from the shift register of the gate line side driver (shift register for vertical scanning) through a gate signal line.

This operation is sequentially repeated at suitable timing by a signal from the shift register of the source line side driver and a signal from the shift register of the gate line side driver, so that information is sequentially written into each of the pixels arranged in matrix.

FIG. 2 is a schematic view showing the scan of the respective pixels by such a conventional driving method. Reference numeral 201 denotes a source line side driver, 202 denotes a gate line side driver, and 203 denotes a pixel region in which a plurality of pixel TFTs are arranged in matrix. Reference numeral 204 denotes the scanning direction of the pixel TFTs.

The pixel TFTs are sequentially scanned in the direction 204, and after image information for one picture is written, writing of image information for a next picture is carried out. In this way, the display of picture images is sequentially carried out. In general, the writing of information for one picture is carried out 30 times or 60 times a second.

In recent years, with the rapid increase of the amount of information to be treated, it has been designed to increase the display capacity and to improve display resolution. Here, examples of generally used display resolution of a computer will be shown below with the number of pixels and the name of standards.

| Number of pixels: (Horizontal x Vertical) | Name of standards |
| --- | --- |
| 640 x 400 | EGA |
| 640 x 480 | VGA |
| 800 x 600 | SVGA |
| 1024 x 768 | XGA |
| 1280 x 1024 | SXGA |

Recently, also in the field of a personal computer, since software for making a plurality of expressions with different characters on a display has come into wide use, a display device corresponding to the XGA or SXGA standard with resolution higher than the VGA or SVGA standard becomes common.

However, a display system according to a conventional structure has a problem described below in realizing the foregoing high display resolution.

In a conventional liquid crystal electrooptical device, due to such reasons that (1) the mobility of a thin film transistor is low, and (2) a long time is required for writing of data into liquid crystal pixels, a sampling clock frequency especially in a horizontal direction can not be increased, so that a high speed operation has been difficult.

Especially, as a displayed picture becomes large (the number of display pixels increases), these phenomena have been remarkable, since a large amount of data is used.

Moreover, the above-mentioned liquid crystal display device having high resolution comes to be used also as display of a television signal other than display of a data signal in a personal computer.

In recent years, in order to realize a beautiful picture quality as in a high definition TV (HDTV) or an extended definition TV (EDTV), image data for one picture becomes several times that of a conventional TV. Moreover, since the easiness of viewing is improved and it becomes possible to display a plurality of pictures on one display device by enlargement of a screen, a large screen comes to be increasingly required. For realization of these as well, it is urgently required to realize a high speed operation of a liquid crystal display device.

SUMMARY OF THE INVENTION

According to an aspect of the present invention, an active matrix type display device comprises a plurality of pixel TFTs arranged in matrix; a plurality of source line side drivers for driving the plurality of pixel TFTs; one gate line side driver; a picture image signal supply source; a memory circuit for storing and transmitting picture signals from the picture image signal supply source; and a controller for controlling the memory circuit, wherein the memory circuit transmits the picture signals to the corresponding plurality of source line side drivers at the same time. By this, the foregoing object of the present invention is achieved.

According to another aspect of the present invention, an active matrix type display device comprises a plurality of pixel TFTs arranged in matrix; 2n (n is a natural number) source line side drivers for driving the plurality of pixel TFTs; one gate line side driver; a picture signal supply source; a memory circuit for storing and transmitting picture signals from the picture signal supply source; and a controller for controlling the memory circuit, wherein the memory circuit includes at least two memory regions; when at least one memory region of the at least two memory regions is in a writing mode for storing the picture signals from the picture signal supply source, the other memory region is in a reading mode for transmitting the stored picture signals; when the memory regions are respectively in the writing mode, the picture signals are stored in order of input; and when the memory regions are respectively in the reading mode, the stored picture signals, the number of which is equal to that of the plurality of source line side drivers, are transmitted at the same time to concurrently drive the corresponding plurality of source line side drivers. By this, the foregoing object of the present invention is achieved.

According to still another aspect of the present invention, an active matrix type display device comprises a plurality of pixel TFTs arranged in matrix; two source line side drivers for driving the plurality of pixel TFTs; one gate line side driver; a picture signal supply source; first and second line memories; and a controller for controlling the first and second line memories, wherein each of the first and second line memories includes first and second memory regions; when one of the first and second line memories is in a writing mode for storing picture signals from the picture signal supply source, the other is in a reading mode for transmitting the stored picture signals; when each of the first and second line memories is in the writing mode, the picture signals are stored in the first memory and the second memory in this order; and when the first and second memory regions are respectively in the reading mode, the stored picture signals are transmitted from the first memory and the second memory at the same time to concurrently drive the two source line side drivers. By this, the foregoing object is achieved.

BRIEF DESCRIPTION OF THE DRAWINGS

In the accompanying drawings:

FIG. 4 is a block diagram of a liquid crystal display device of the present invention;

FIG. 6 is a timing chart of operation of the line memories of the liquid crystal display device of the present invention;

DETAILED DESCRIPTION OF THE PREFERRED EMBODIMENTS

Preferred embodiments of the present invention will now be described.

Embodiment 1

Figure 1:
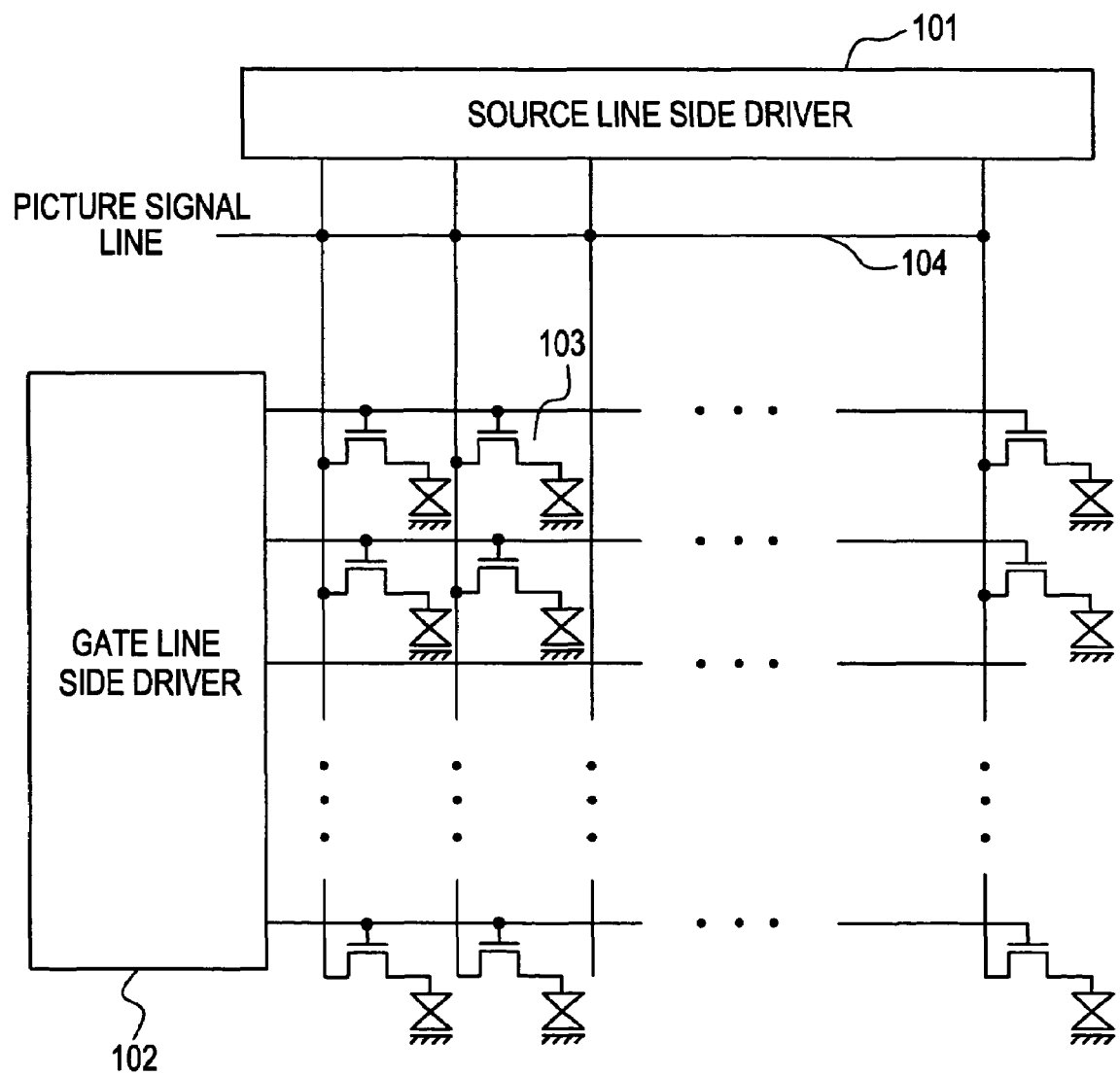
FIG. 1 is a schematic structural view showing a conventional liquid crystal display device.
Figure 2:
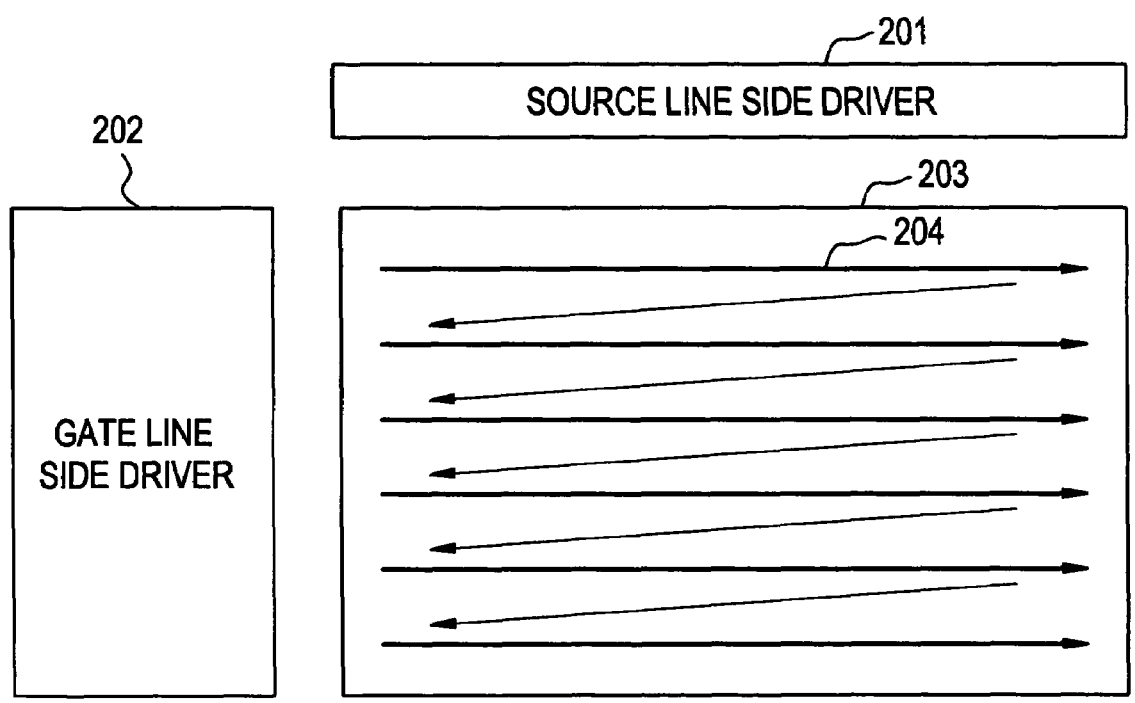
FIG. 2 is a view showing the scan sequence of pixels of a conventional liquid crystal display device.
Figure 3:
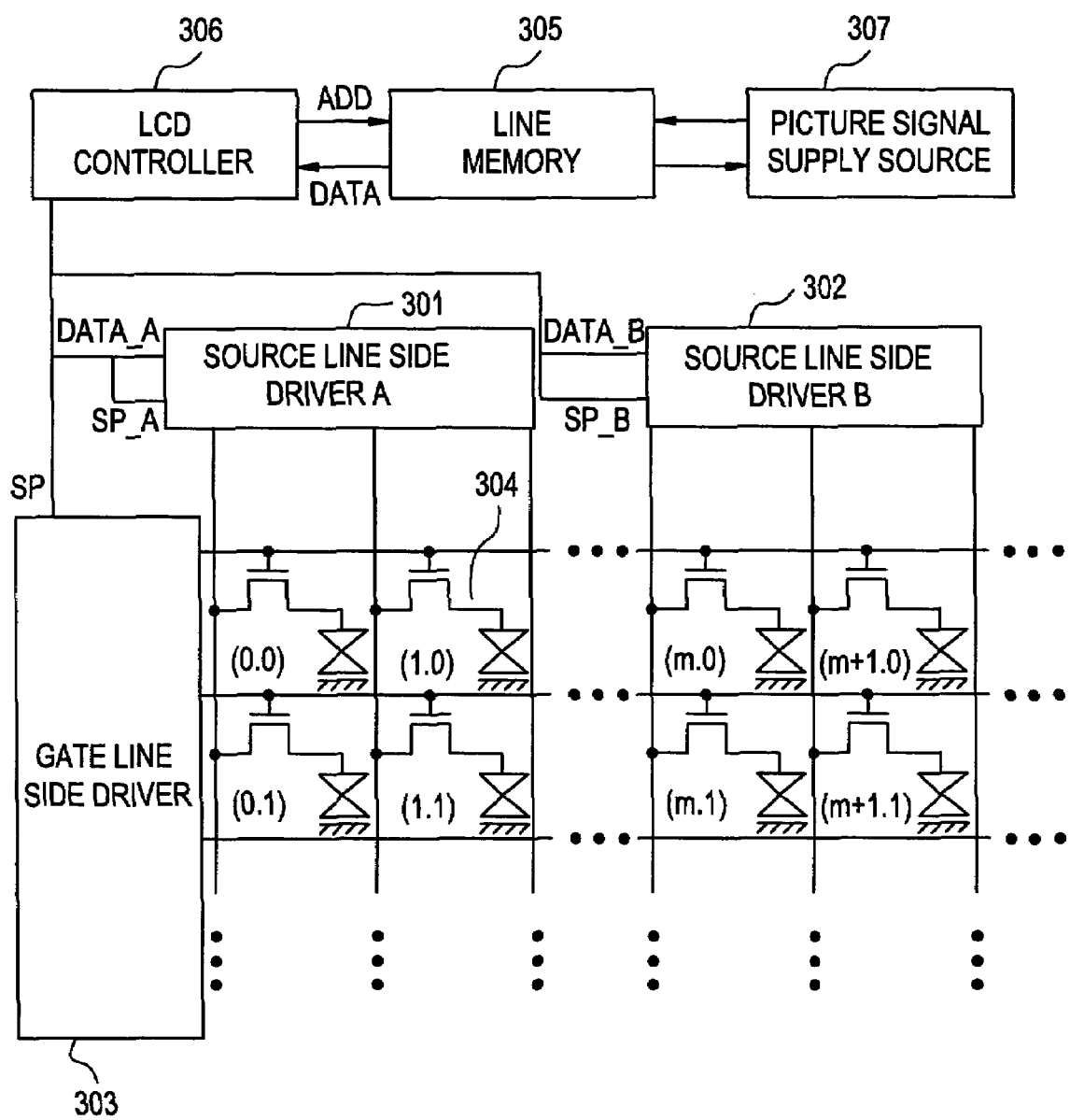
FIG. 3 is a schematic structural view showing a liquid crystal display device of the present invention.

FIG. 3 is a schematic structural view showing a liquid crystal display device according to this embodiment. The liquid crystal display device of this embodiment is provided with two source line side drivers 301 and 302, which will be referred to as a source line side driver A and a source line side driver B, respectively. Reference numeral 303 denotes a gate line side driver. Reference numeral 304 denotes pixel TFTs and the plurality of pixel TFTs 304 are arranged in matrix to form a pixel region. In the liquid crystal display device of this embodiment, 2 m×n (m and n are respectively a natural number) TFTs are arranged. Each of the pixel TFTs is connected to a pixel electrode, and a liquid crystal is held between the pixel electrode and a common opposite electrode. These structural elements constitute a pixel. In this embodiment, the respective pixels are given characters such as (0, 0) (0,1), and (m, 1). Reference numeral 305 denotes a line memory as a memory circuit, 306 denotes an LCD controller, and 307 denotes a picture signal supply source.

In the liquid crystal display device of this embodiment, the plurality of TFTs arranged in matrix in the pixel region are driven by the two source line side drivers 301 and 302, and the one gate line side driver. In this embodiment, the source line side driver A 301 drives pixels (0, 0) to (m–1, n–1), and the source line side driver B 302 drives pixels (m, 0) to (2m–1, n–1).

FIG. 4 is a block diagram of a liquid crystal display device of this embodiment. A picture signal supply source 401 supplies digital picture signals to line memories 402 and 403. A timing signal generating circuit 404 generates signals for taking operation timing and supplies the signals to the picture signal supply source 401, a memory writing/reading address control circuit 405, a line counter 408, and a frame counter 409. Each of the line memories 402 and 403 includes a memory for one line. In this embodiment, the line memory 402 is composed of two memories (memory 1, memory 2). The line memory 403 is composed of two memories (memory 3, memory 4). A memory read data control circuit 406 controls picture data supplied from the line memories 402 and 403 to transmit the data to a display data generating circuit 407. The display data generating circuit 407 transmits the picture data from the memory read data control circuit 406 to a source line side driver A 410 and a source line side driver B 411 in accordance with signals from the line counter 408 and the frame counter 409, and transmits a selection signal of a gate line of a pixel TFT to a gate line side driver 412. A plurality of pixels of a pixel region 413 are switched by signals supplied from the source line side driver A, the source line side driver B, and the gate line side driver 412.

In this embodiment, a control circuit including the timing signal generating circuit 404, the memory writing/reading address control circuit 405, the memory read data control circuit 406, the display data generating circuit 407, the line counter 408, and the frame counter 409 will be referred to as an LCD controller.

Figure 5A:
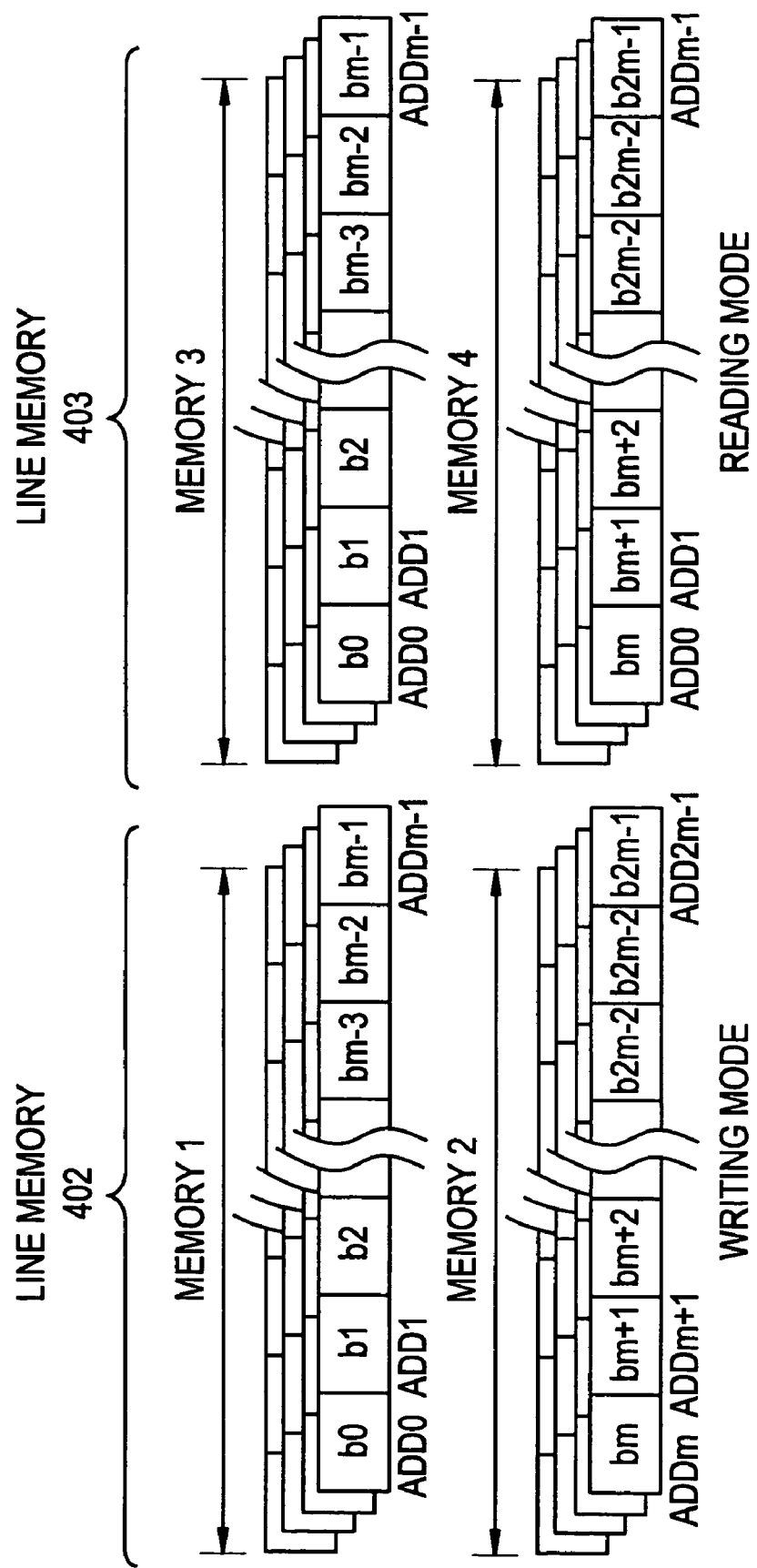
FIGS. 5A and 5B are views showing line memories of the liquid crystal display device of the present invention.
Figure 5B:
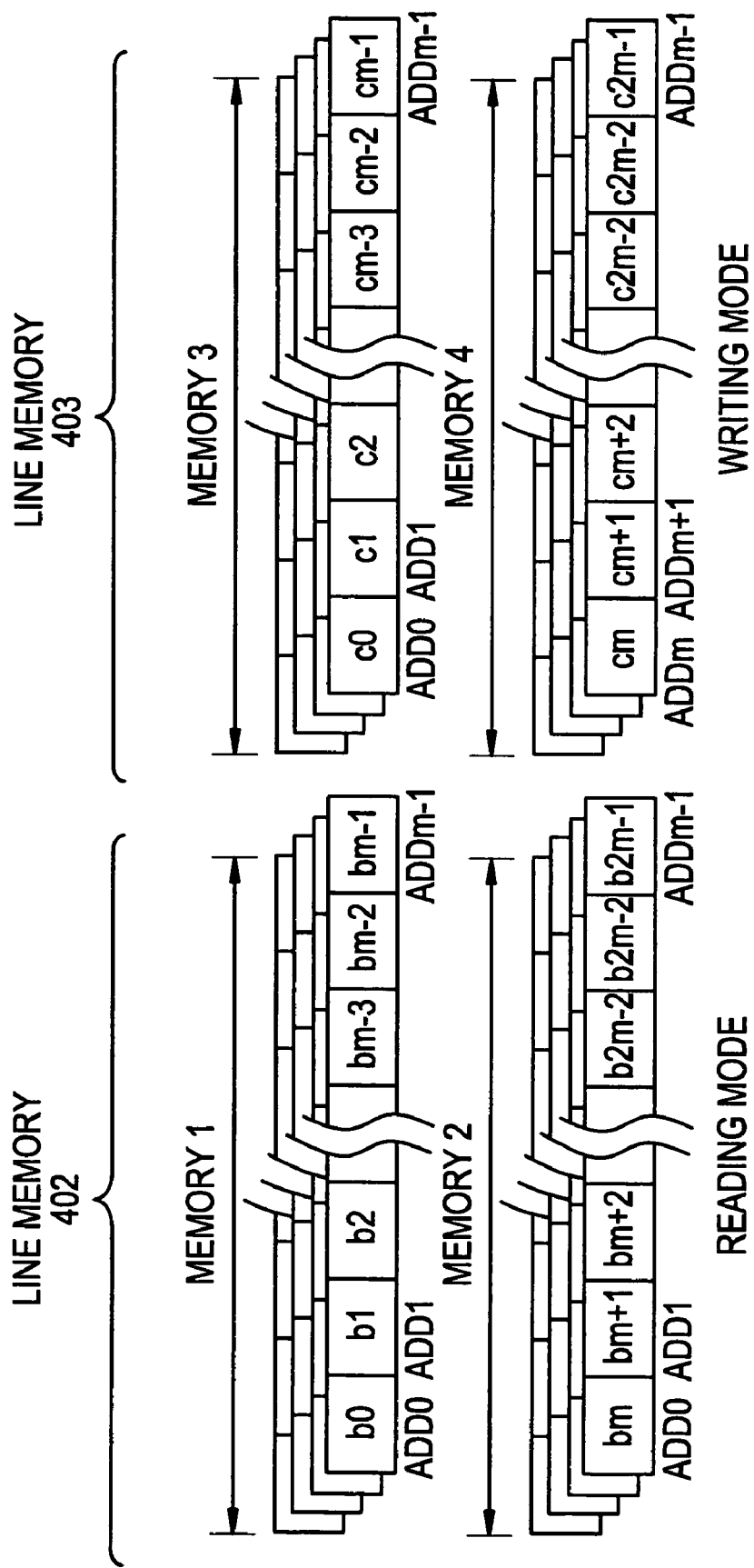

Next, reference is made to FIGS. 5A and 5B. FIGS. 5A and 5B show the line memories 402 and 403. In this embodiment, each of the line memories 402 and 403 can store 2 m pieces of data (picture signals). The size of one data is made 4 bits. Thus, in this embodiment, the memory capacity of each of the line memory 402 and the line memory 403 is 4×2 m=8 m bits. The line memory 402 is divided into two memories (memory 1, memory 2), and the line memory 403 is divided into two memories (memory 3, memory 4).

The size of one data may be changed according to necessity. For example, it may be changed according to required gradations of display.

In this embodiment, although two line memories are used, a plurality of line memories may be used. Moreover, a memory such as a FIFO (first in first out) memory may be used.

A DRAM, VRAM, or SRAM may be used as a memory.

Reference is made to FIGS. 5A and 5A As shown in FIGS. 5A and 5B, when one of the line memories 402 and 403 stores picture data from the picture signal supply source 401, that is, the one is in a writing mode, the other is in a mode in which picture data is transmitted to the memory read data control circuit 406, that is, in a reading mode. Like this, a region of a memory circuit which can operate in different modes, such as the line memories 402 and 403, will be referred to as a memory region.

In FIG. 5A, the line memory 402 is in the writing mode. The memory 1 and memory 2 constituting the line memory 402 are assigned addresses. Addresses ADD0 to ADDm−1 are assigned to the memory 1, and addresses ADDm to ADD2m−1 are assigned to the memory 2. This assignment of the addresses is carried out by the memory address writing/reading address control circuit.

When the line memory 402 is in the writing mode, the memory writing/reading address control circuit sequentially specifies the addresses from ADD0 to ADD2m−1, so that a series of picture data b0 to b2m−1 supplied from the picture signal supply source 401 are sequentially written into the addresses ADD0 to ADD2m−1. Thus, the picture data are written into the memory 1 and memory 2 in this order.

As described above, when the line memory 402 is in the writing mode, the line memory 403 is in the reading mode. When the line memory 403 is in the reading mode, addresses ADD0 to ADDm−1 are assigned to the memory 3 and memory 4 constituting the line memory 403. This assignment of the addresses is carried out by the memory writing/reading address control circuit 405.

When the line memory 403 is in the reading mode, the memory writing/reading address control circuit sequentially specifies addresses from ADD0 to ADDm−1, so that data a0 to a2m−1 stored in the addresses ADD0 to ADDm−1 are sequentially read. However, since a series of same addresses are assigned to the memory 3 and memory 4, data a0 to am−1 stored in the memory 3 and data am to a2m−1 stored in the memory 4 are read at the same time in order of address specification.

A clock frequency at which picture signals are written into the line memory 402 must be higher than a clock frequency at which picture signals are read from the line memory 403 into the memory read data control circuit. In this embodiment, the clock frequency at which picture signals are written into the line memory 402 is made twice the clock frequency at which picture signals are read from the line memory 403 into the memory read data control circuit.

After all data stored in the memory 3 and memory 4 constituting the line memory are transmitted to the memory read data control circuit, the line memory 402 becomes in the reading mode, and the line memory 403 becomes in the writing mode.

In FIG. 5B, the line memory 402 is in the writing mode. Addresses are assigned to the memory 1 and memory 2 constituting the line memory 402. Addresses ADD0 to ADDm−1 are assigned to the memory 1, and addresses ADD0 to ADDm−1 are assigned to the memory 2. When the line memory 403 is in the reading mode, signals b0 to b2m−1 of the addresses ADD0 to ADDm−1 stored by the above described operation are sequentially read into the memory read data control circuit. However, since a series of same addresses are assigned to the memory 1 and the memory 2, the signals b0 to bm−1 stored in the memory 1 and the signals bm to b2m−1 stored in the memory 2 are read at the same time in order of address specification.

On the other hand, at this time, the line memory 403 is in the writing mode. When the line memory 403 is in the writing mode, signals c0 to c2m−1 supplied from the picture signal supply source 401 are sequentially written in the addresses ADD0 to ADD2m−1. Thus, picture signals are written in order of the memory 3 and memory 4.

FIG. 6 shows a timing chart of operation of the foregoing line memories 402 and 403. As shown in FIG. 6 as well, it is understood that when one of the line memory 402 and the line memory 403 is in the writing mode, the other is in the reading mode. In both the line memories 402 and 403, the writing mode operation and reading mode operation are alternately carried out.

The data a0 to am−1 and am to a2m−1 read to the memory read data control circuit 406 from the memory 3 and memory 4 constituting the line memory 403 are supplied to the display data generating circuit 407 at the same time. The data a0 to am−1 and am to a2m−1 supplied to the display data generating circuit 407 are respectively supplied to the source line side driver A and the source line side driver B at the same time.

The line counter 408 counts the number of data supplied to the source line side driver A and the source line side driver B, and at the time when m pieces of data are supplied, the line counter transmits start pulses to the source line side driver A and the source line side driver B.

The frame counter 409 transmits a start pulse to the gate line side driver at the time when m signals are supplied n times to the source line side driver A and the source line side driver B.

The signals supplied to the source line side driver A and the source line side driver B are sequentially transmitted to the pixel TFTs, and the corresponding pixel TFTs are sequentially turned on.

Figure 7:
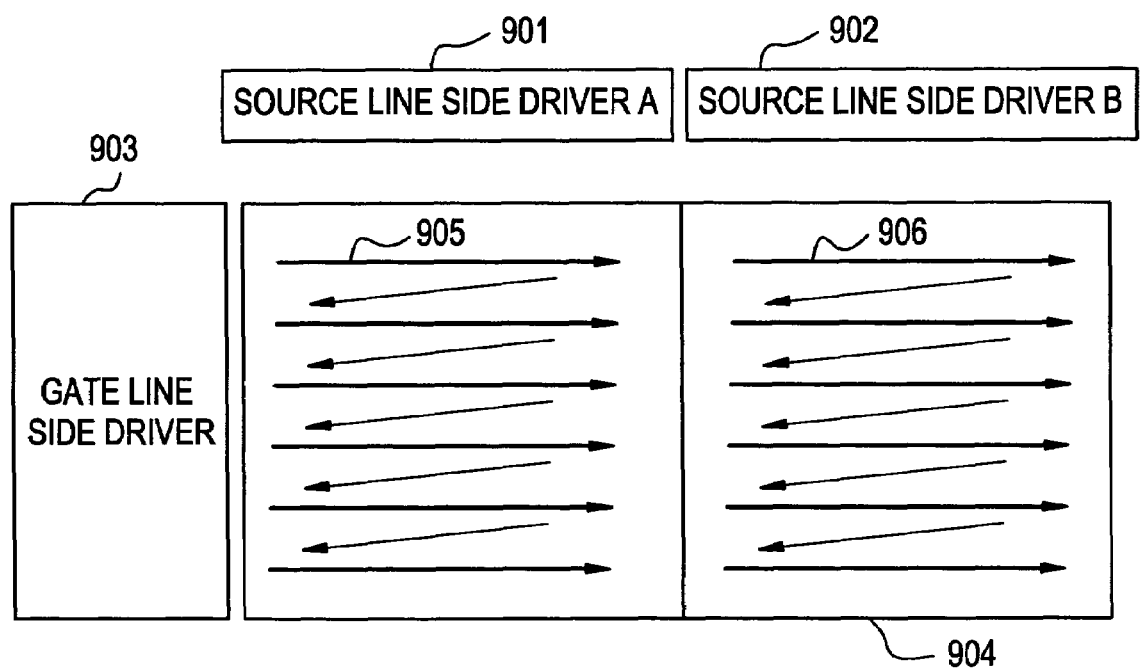
FIG. 7 is a view showing the scan sequence of pixels of the liquid crystal display device of the present invention.

FIG. 7 shows scan sequence of the pixel TFTs of the liquid crystal display device of this embodiment. In FIG. 7, 905 denotes the direction and sequence in which the source line side driver A scans the pixel TFTs. Reference numeral 906 denotes the direction and sequence in which the source line side driver B scans the pixel TFTS.

As described above, according to this embodiment, the pixel TFTs on the same gate signal line are driven by the source line side driver A and the source line side driver B. Thus, it is understood that a time in which scanning of pixels for one line is carried out can be made shorter than that of a conventional driver circuit.

Accordingly, even in the case where a TFT with a slow operation speed is used, according to this embodiment, it is possible to drive a display device of a large screen with high resolution.

Moreover, even if a substantial operation speed, clock frequency and the like of a source line side driver are not changed, it is possible to realize higher speed picture display than the prior art.

In this embodiment, although the high speed display of a picture can be realized by using the two line memories and by supplying picture data at the same time to the two source line side drivers, it is possible to make such modification that two line memories or an equivalent memory circuit is used and the line memories or the memory circuit is divided into n memory regions to supply data to n source line side drivers at the same time. In this case, it is designed such that a start pulse is transmitted to each of the n source line side drivers.

In this case, data read from the line memory in a reading mode or from the memory circuit are supplied to the n source line side drivers at the same time. By doing so, display can be made with a pixel region divided into n pieces, so that it is possible to perform picture display at a higher speed.

In the above-mentioned case, the number of divisions of the pixel region can be changed by providing a circuit for selecting input of start pulses into the n source line side drivers and by controlling the input of the start pulses into the n source line side drivers according to the change of the number of divisions of the line memories or the memory circuit.

Embodiment 2

In this embodiment, manufacturing steps of a liquid crystal display device including the LCD controller and the line memories used in the embodiment 1 will be described.

In this embodiment, an example in which a plurality of TFTs are formed on a substrate having an insulating surface to monolithically constitute a peripheral circuit including a pixel matrix circuit and a driver circuit, will be shown in FIGS. 8 to 12. In this embodiment, as an example of the peripheral circuit such as the LCD controller, line memory, and driver, a CMOS circuit of a basic circuit will be shown. In this embodiment, although description is made to manufacturing steps of a CMOS circuit in which a P-channel TFT and N-channel TFT are respectively provided with one gate electrode, it is possible to similarly manufacture a CMOS circuit in which a plurality of gate electrodes are provided, such as a double gate type.

Reference is made to FIGS. 8A to 8D. First, a quartz substrate 801 is prepared as a substrate having an insulating surface. Instead of the quartz substrate, a silicon substrate on which a thermal oxidation film is formed, may be used. In addition, it is possible to adopt such a method that an amorphous silicon film is temporarily formed on a quartz substrate and is completely heat oxidized to make an insulating film. Moreover, a quartz substrate, a ceramic substrate, or a silicon substrate on which a silicon nitride film is formed as an insulating film, may be used.

Reference numeral 802 denotes an amorphous silicon film, and its thickness is adjusted so that the final film thickness (film thickness obtained after giving consideration to decrease of the film after thermal oxidation) becomes 10 to 75 nm (preferably 15 to 45 nm). Incidentally, it is important to carry out management of impurity concentration in the film at film formation.

In the case of this embodiment, management is made so that the concentration of each of C (carbon), N (nitrogen), O (oxygen), and S (sulfur) as typical impurities in the amorphous silicon film 802 becomes less than $5 \times 10^{18}$ atoms/cm$^3$ (preferably not larger than $1 \times 10^{18}$ atoms/cm$^3$). If the concentration of the respective impurities exceeds this value, the impurities have a bad influence at crystallization and may cause the film quality after crystallization to deteriorate.

The concentration of hydrogen in the amorphous silicon film 802 is also an important parameter, and when the hydrogen content is made low, it appears that a film having superior crystallinity is obtained. Thus, it is preferable that the film formation of the amorphous silicon film 802 is carried out by a low pressure CVD method. Incidentally, it is also possible to use a plasma CVD method by optimizing film forming conditions.

Next, a crystallizing step of the amorphous silicon film 802 is carried out. A technique disclosed in Japanese Patent Unexamined Publication No. Hei. 7-130652 is used as a means for crystallization. Although means of both embodiment 1 and embodiment 2 of the publication may be used, it is preferable to use a technique disclosed in the embodiment 2 of the publication (the details are disclosed in Japanese Patent Unexamined Publication No. Hei. 8-78329).

In the technique disclosed in Japanese Patent Unexamined Publication No. Hei. 8-78329, a mask insulating film 803 for selecting added regions of a catalytic element is first formed. The mask insulating film 803 includes a plurality of openings for addition of the catalytic element. It is possible to determine the positions of crystallized regions by the positions of the openings.

Figure 8A:
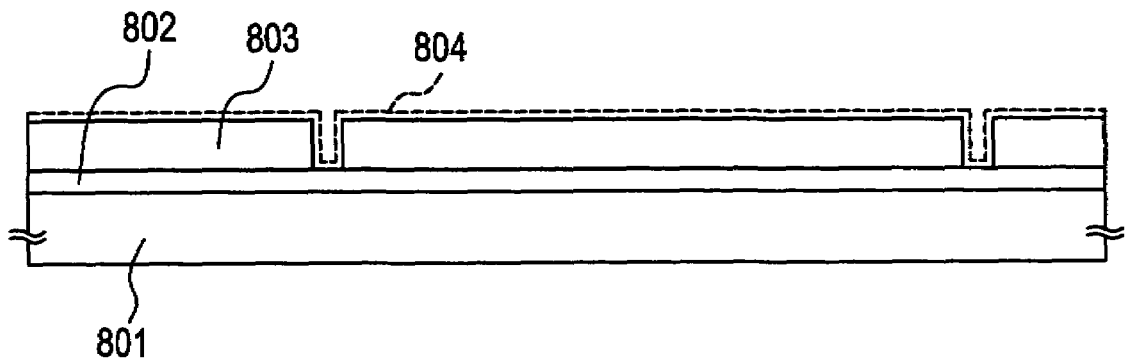
FIGS. 8A to 8D are views showing manufacturing steps of a liquid crystal display device of the present invention.

Then a solution containing nickel (Ni) as the catalytic element for promoting crystallization of an amorphous silicon film is applied by a spin coating method to form a layer 804 including Ni. As the catalytic element, it is also possible to use cobalt (Co), iron (Fe), palladium (Pd), platinum (Pt), copper (Cu), gold (Au) or the like other than nickel (FIG. 8A).

As the adding step of the catalytic element, it is also possible to use an ion implantation method or a plasma doping method using a resist mask. In this case, since it becomes easy to lower an occupied area of an added region and to control a growth distance of a lateral growth region, the method becomes an effective technique when a minute circuit is formed.

Next, after the adding step of the catalytic element is ended, dehydrogenating at 450° C. for about 1 hour is carried out, and then a heat treatment is carried out in an inert gas atmosphere, a hydrogen atmosphere, or an oxygen atmosphere at a temperature of 500 to 700° C. (typically 550 to 650° C.) for 4 to 24 hours to crystallize the amorphous silicon film 802. In this embodiment, a heat treatment at 570° C. for 14 hours is carried out in a nitrogen atmosphere.

Figure 8B:
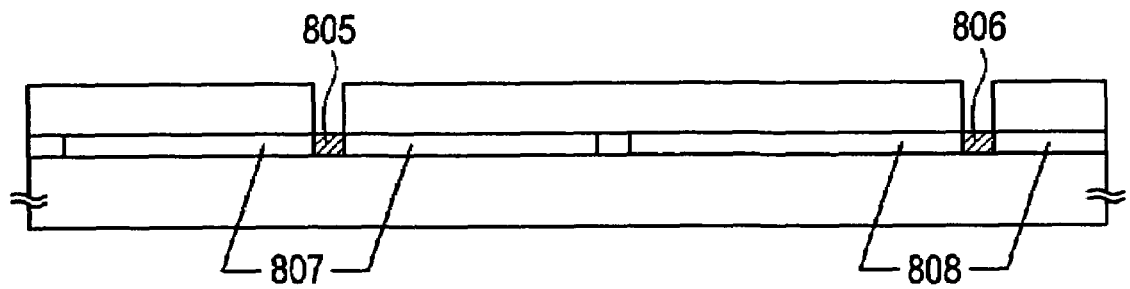

At this time, crystallization progresses first from nuclei generated in regions 805 and 806 in which nickel was added, so that crystalline regions 807 and 808 grown almost in parallel to the surface of the substrate 801 are formed. Each of these crystalline regions 807 and 808 will be referred to as a lateral growth region. Since individual crystals in the lateral growth region are gathered in a state in which they are relatively uniform, the lateral growth region has an advantage that the total crystallinity is excellent (FIG. 8B).

Even in the case where a technique disclosed in embodiment 1 of the foregoing Japanese Patent Unexamined Publication No. Hei. 7-130652 is used, a region which can be called microscopically a lateral growth region is formed. However, since generation of nuclei occurs irregularly in a surface, the technique has a disadvantage in the controllability of crystal grain boundaries.

Figure 8C:
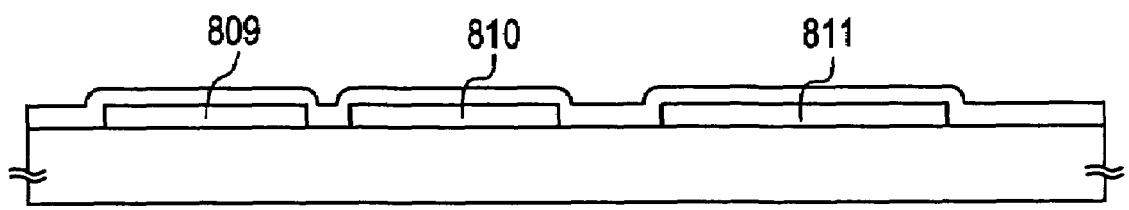

After the heat treatment for crystallization is ended, the mask insulating film 803 is removed and patterning is carried out to form island-like semiconductor layers (active layers) 809, 810 and 811 made of the lateral growth regions 807 and 808 (FIG. 8C).

Reference numeral 809 denotes the active layer of an N-type TFT constituting the CMOS circuit, 810 denotes the active layer of a P-type TFT constituting the CMOS circuit, and 811 denotes the active layer of an N-type TFT (pixel TFT) constituting the pixel matrix circuit.

After the active layers 809, 810 and 811 are formed, a gate insulating film 812 made of an insulating film containing silicon is formed thereon.

Figure 8D:
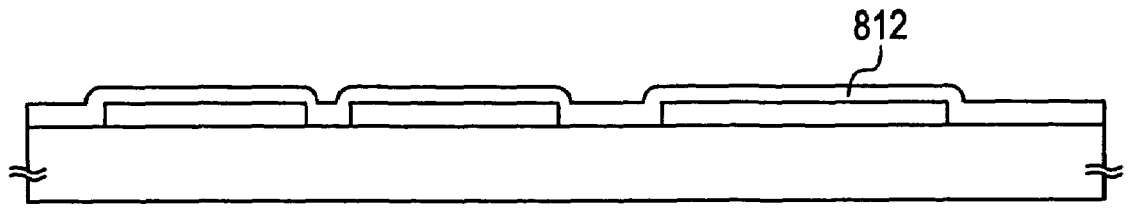

Next, as shown in FIG. 8D, a heat treatment (gettering process of the catalytic element) for removing or lowering the catalytic element (nickel) is carried out. In this heat treatment, a halogen element is contained in a processing atmosphere, and the gettering effect of the halogen element for a metallic element is used.

In order to sufficiently obtain the gettering effect of the halogen element, it is preferable to carry out the foregoing heat treatment at a temperature exceeding 700° C. If a temperature is not higher than this temperature, decomposition of a halogen compound in the processing atmosphere becomes difficult, so that there is a fear that the gettering effect comes not to be obtained.

Thus, in this embodiment, this heat treatment is carried out at a temperature exceeding 700° C., preferably 800 to 1,000° C. (typically 950° C.) and for a processing time of 0.1 to 6 hours, typically 0.5 to 1 hour.

In this embodiment, there is shown an example in which in an atmosphere of an oxygen atmosphere containing hydrogen chloride (HCl) with a concentration of 0.5 to 10 vol % (in this embodiment, 3 vol %), a heat treatment at 950° C. for 30 minutes is carried out. If the concentration of HCl is above the foregoing concentration, unevenness comparable with the film thickness is formed on the surface of the active layers 809, 810 and 811. Thus, such a high concentration is not preferable.

Although the example in which the HCl gas is used as a compound containing a halogen element has been described, a kind of or plural kinds of compounds containing halogen selected from the group typically consisting of HF, $NF_3$, HBr, $Cl_2$, $ClF_3$, $BCl_3$, $F_2$, and $Br_2$ may be used as a gas other than the HCl gas.

In this step, it is considered that nickel in the active layers 809, 810 and 811 is gettered by the action of chlorine and is converted into volatile nickel chloride to escape into the air, so that nickel is removed. By this step, the concentration of nickel in the active layers 809, 810 and 811 is lowered to $5 \times 10^{17}$ atoms/cm$^3$ or less.

The value of $5 \times 10^{17}$ atoms/cm$^3$ is a detection limit of the SIMS (Secondary Ion Mass Spectrometry). As a result of analysis of TFTs experimentally formed by the present inventors, when the concentration was $1 \times 10^{18}$ atoms/cm$^3$ or less (preferably $5 \times 10^{17}$ atoms/cm$^3$ or less), the influence of nickel on the TFT characteristics was not ascertained. Incidentally, the concentration of an impurity in the present specification is defined as a minimum value of measurement results of the SIMS analysis.

By the above heat treatment, a thermal oxidation reaction progresses in the interface between the gate insulating film 812 and the active layers 809, 810 and 811, so that the thickness of the gate insulating film 812 is increased by a thermal oxidation film. When the thermal oxidation film is formed in this way, it is possible to obtain the interface between the semiconductor and the insulating film, which has very few interfacial levels. Moreover, there is also obtained an effect to prevent inferior formation (edge thinning) of a thermal oxidation film at the end of an active layer.

Further, it is also effective that after the heat treatment in the halogen atmosphere is carried out, a heat treatment at 950° C. for about 1 hour is carried out in a nitrogen atmosphere to improve the film quality of the gate insulating film 812.

It is also ascertained by the SIMS analysis that the halogen element used in the gettering process remains in the active layers 809, 810, and 811 at the concentration of $1 \times 10^{15}$ atoms/cm$^3$ to $1 \times 10^{20}$ atoms/cm$^3$. Moreover, at that time, it is ascertained by the SIMS analysis that the foregoing halogen element with a high concentration is distributed between the thermal oxidation film formed by the heat treatment and the active layers 809, 810 and 811.

As the result of the SIMS analysis with respect to other elements, it is ascertained that the concentration of each of typical impurities of C (carbon), N (nitrogen), O (oxygen) and S (sulfur) is less than $5 \times 10^{18}$ atoms/cm$^3$ (typically not larger than $1 \times 10^{18}$ atoms/cm$^3$).

Figure 9A:
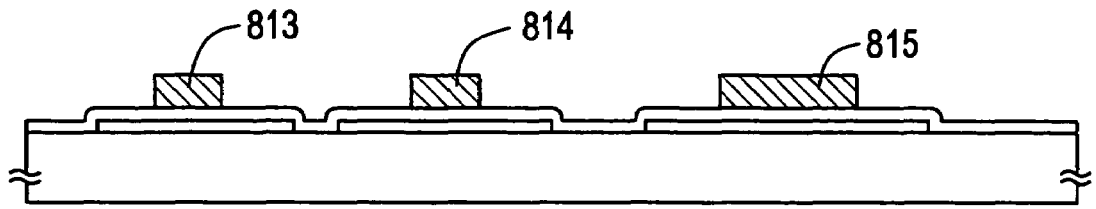
FIGS. 9A to 9D are views showing manufacturing steps of the liquid crystal display device of the present invention.

Next, a not-shown metallic film mainly containing aluminum is formed, and patterning is carried out to form origins 813, 814 and 815 of subsequent gate electrodes. In this embodiment, an aluminum film containing scandium of 2 wt % is used (FIG. 9A).

Figure 9B:
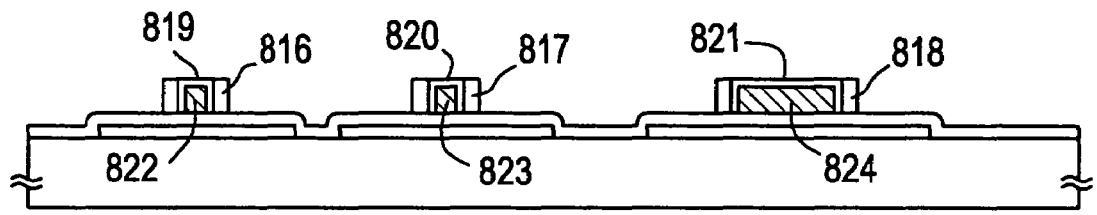

Next, porous anodic oxidation films 816, 817 and 818, nonporous anodic oxidation films 819, 820 and 821, and gate electrodes 822, 823 and 824 are formed by a technique disclosed in Japanese Patent Unexamined Publication No. Hei. 7-135318 (FIG. 9B).

Figure 9C:
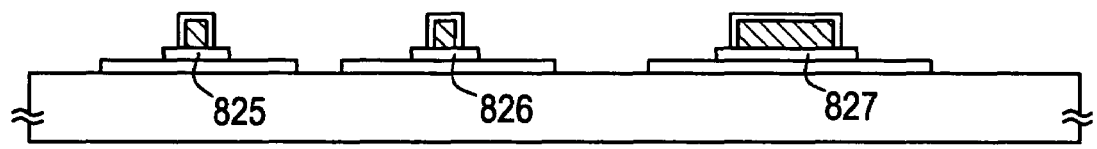

In this way, after the state of FIG. 9B is obtained, the gate insulating film 812 is next etched while the gate electrodes 822, 823 and 824, and the porous anodic oxidation films 816, 817 and 818 are used as masks. Then the porous anodic oxidation films 816, 817 and 818 are removed to obtain the state shown in FIG. 9C. In FIG. 9C, reference numerals 825, 826 and 827 denote gate insulating films after the processing.

Next, an adding step of an impurity element for giving one conductivity is carried out. As the impurity element, P (phosphorus) or As (arsenic) for an N type, or B (boron) for a P type may be used.

In this embodiment, impurity addition is divided into two steps and is carried out. A first impurity adding step (P (phosphorus) is used in this embodiment) is carried out with a high acceleration voltage of about 80 KeV to form an n⁻ region. This n⁻ region is adjusted so that the concentration of P ions becomes $1\times10^{18}$ atoms/cm³ to $1\times10^{19}$ atoms/cm³.

Moreover, a second impurity adding step is carried out with a low acceleration voltage of about 10 KeV to form an n⁺ region. At this time, since the acceleration voltage is low, the gate insulating film functions as a mask. This n⁺ region is adjusted so that the sheet resistance thereof becomes not higher than 500 Ω (preferably not higher than 300 Ω).

Through the above steps, there are formed a source region 828, a drain region 829, a low concentration impurity region 830, and a channel formation region 831 of the N-type TFT constituting the CMOS circuit. Moreover, there are defined a source region 832, a drain region 833, a low concentration impurity region 834, and a channel formation region 835 of the N-type TFT constituting the pixel TFT (FIG. 9D).

Figure 9D:
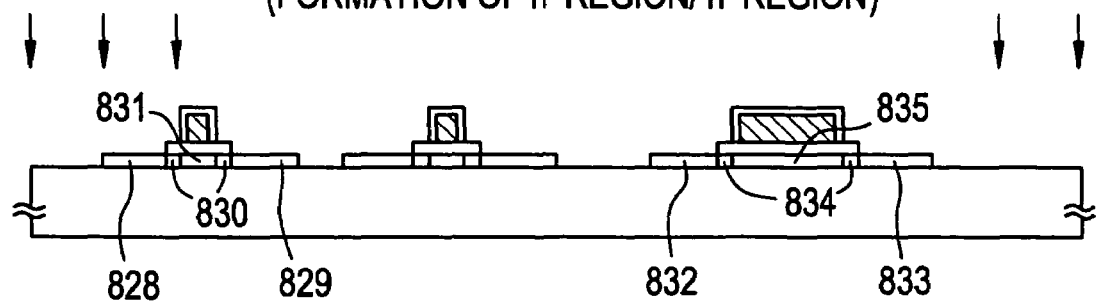

In the state shown in FIG. 9D, an active layer of the P-type TFT constituting the CMOS circuit has the same structure as the active layer of the N-type TFT.

Figure 10A:
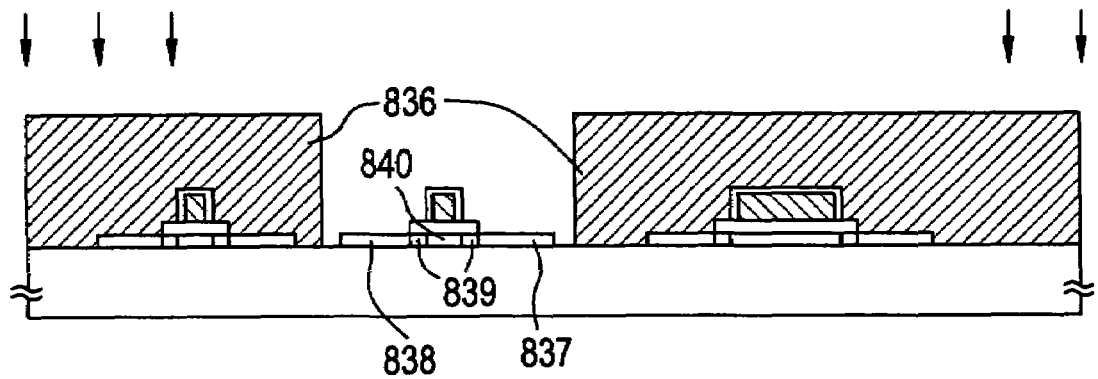
FIGS. 10A to 10C are views showing manufacturing steps of the liquid crystal display device of the present invention.

Next, as shown in FIG. 10A, a resist mask 836 is provide to cover the N-type TFTs, and an impurity ion for giving a P type (boron is used in this embodiment) is added.

Although this addition is divided into two steps similarly to the foregoing impurity adding steps, since the N type must be inverted to the P type, B (boron) ions of concentration several times the addition concentration of the foregoing P ions are added.

In this way, there are formed a source region 837, a drain region 838, a low concentration impurity region 839, and a channel formation region 840 of the P-type TFT constituting the CMOS circuit (FIG. 10A).

After the active layer is completed in the manner described above, the impurity ions are activated by the combination of furnace annealing, laser annealing, lamp annealing, and the like. At the same time, damages of the active layers given in the adding steps are also repaired.

Figure 10B:
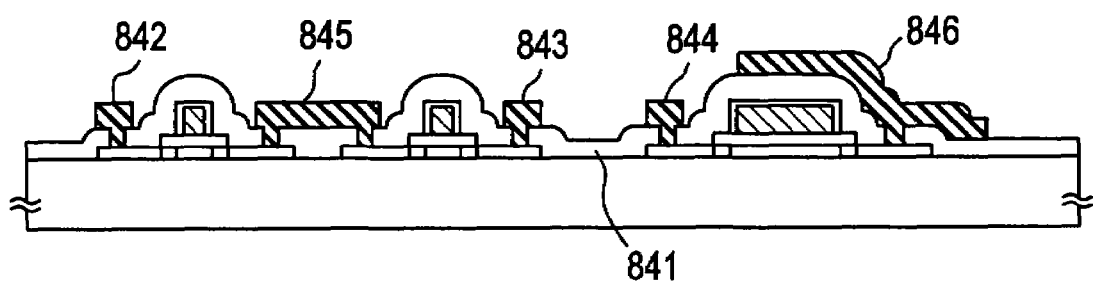

Next, a lamination film of a silicon oxide film and a silicon nitride film is formed as an interlayer insulating film 841, and after contact holes are formed, source electrodes 842, 843 and 844, and drain electrodes 845 and 846 are formed to obtain the state shown in FIG. 10B.

Figure 10C:
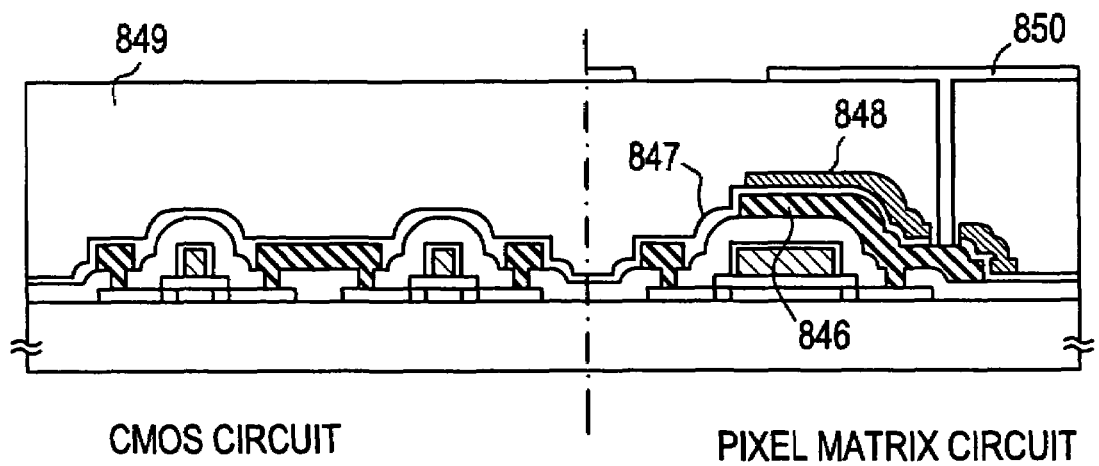

Next, a silicon nitride film 847 with a thickness of 10 to 50 nm, and a black mask 848 are formed (FIG. 10C).

In the structure of FIG. 10C, an auxiliary capacitance is formed between the drain electrode 846 and the black mask 848 through the silicon nitride film 847.

Like this, the structure of FIG. 10C has a feature that the black mask 848 functions also as an upper electrode of the auxiliary capacitance.

Incidentally, in the structure as shown in FIG. 10C, it is possible to prevent an opening rate from lowering by forming the auxiliary capacitance, which is apt to occupy a wide area, on the TFT. Moreover, since it is possible to use the silicon nitride film having high dielectric constant and a thickness of about 25 nm, very large capacitance can be secured with a small area.

Next, a second interlayer insulating film 849 made of an organic resin film and having a thickness of 0.5 to 3 μm is formed. Then a conductive film is formed on the interlayer insulating film 849 and is patterned to form a pixel electrode 850. Since this embodiment relates a transmission type, a transparent conductive film such as ITO is used as a conductive film constituting the pixel electrode 850.

Next, the entire of the substrate is heated in a hydrogen atmosphere of 350° C. for 1 to 2 hours to hydrogenate the entire device, so that dangling bonds (unpaired bonds) in the film (especially in the active layer) are compensated.

Through the above steps, the CMOS circuit and the pixel matrix circuit can be manufactured on the same substrate.

Figure 11:
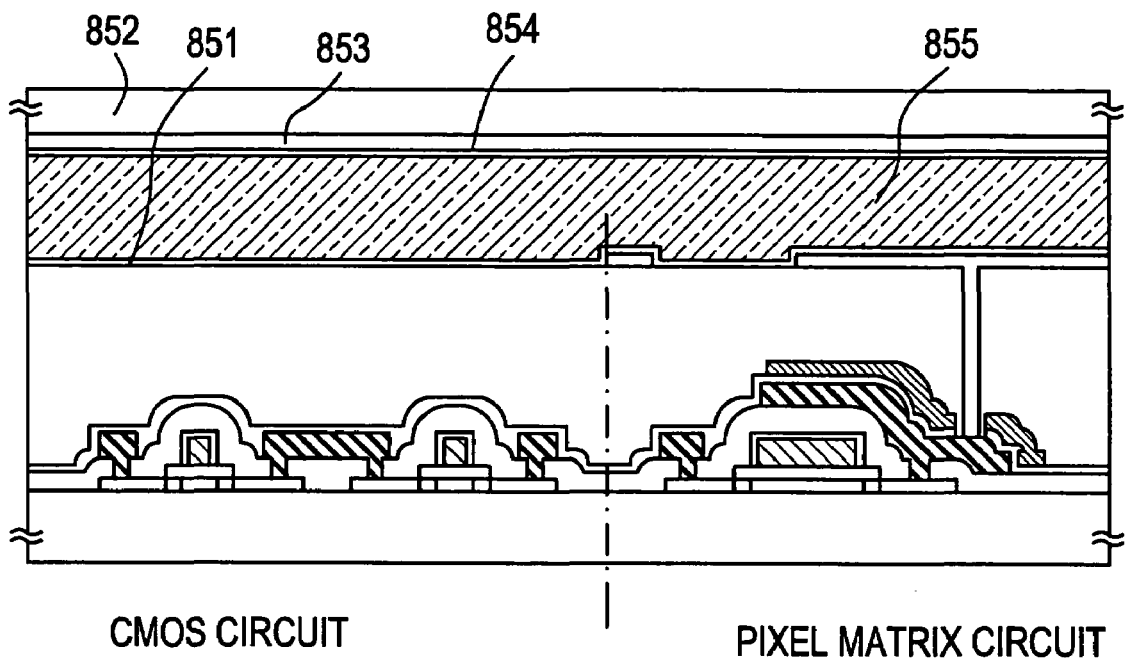
FIG. 11 is a sectional view showing the liquid crystal display device of the present invention.

Next, as shown in FIG. 11, steps of manufacturing a liquid crystal panel on the basis of the active matrix substrate manufactured through the foregoing steps will be described.

An orientation film 851 is formed on the active matrix substrate in the state of FIG. 10C. In this embodiment, polyimide is used for the orientation film 851. Next, an opposite substrate is prepared. The opposite substrate is constituted by a glass substrate 852, a transparent conductive film 853 and an orientation film 854.

In this embodiment, such a polyimide film that liquid crystal molecules are oriented vertically to the substrate is used as the orientation film. Incidentally, the liquid crystal molecules are vertically oriented with a fixed pre-tilt angle by carrying out a rubbing treatment after the formation of the orientation film.

Although a black mask, a color filter and the like are formed on the opposite substrate according to necessity, these are omitted here.

Next, the active matrix substrate and the opposite substrate formed through the above described steps are bonded with each other through a sealing member, a spacer and the like (not shown) by a well known cell assembling step. Thereafter, a liquid crystal material 855 is injected between both the substrates, and is completely sealed by a sealing agent (not shown). In this way, the transmission type liquid crystal panel as shown in FIG. 11 is completed.

In this embodiment, the liquid crystal panel is made to display in an ECB (Electric field Control Birefringence) mode. Thus, a pair of polarizing plates (not shown) are arranged to hold the liquid crystal panel therebetween in cross Nicol (such a state that a polarizing axis of each of a pair of polarizing plates intersects with each other).

Thus, it is understood that in this embodiment, display is made in a normally black mode in which when a voltage is not applied to the liquid crystal panel, black display is made.

Figure 12:
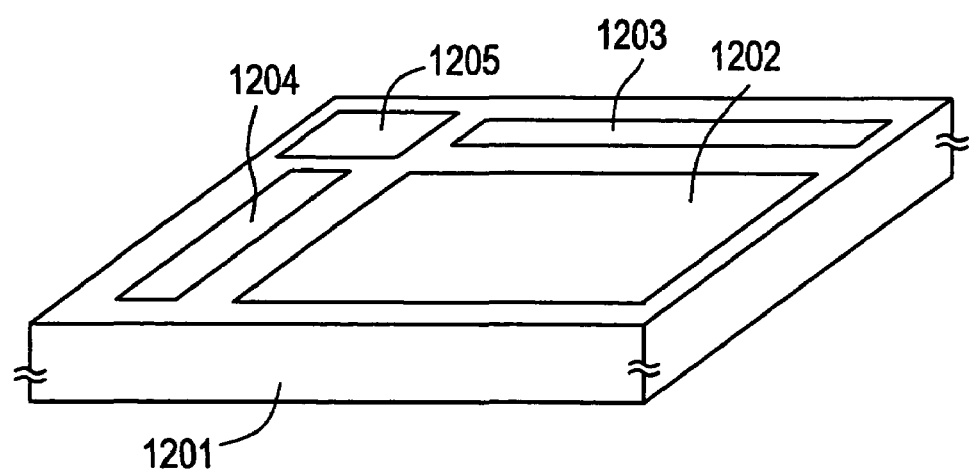
FIG. 12 is a perspective view showing an active matrix substrate of a liquid crystal display device of the present invention.

FIG. 12 schematically shows the outside appearance of an active matrix substrate as shown in FIG. 10C. In FIG. 12, reference numeral 1201 denotes a quartz substrate, 1202 denotes a pixel matrix circuit, 1203 denotes a source driver circuit, 1204 denotes a gate driver circuit, and 1205 denotes a logic circuit including an LCD controller and a line memory.

Although the logic circuit 1205 includes all logical circuits constituted by TFTs in a wide sense, in order to distinguish the logic circuit from a circuit conventionally called a pixel matrix circuit or a driver circuit, the logic circuit means a signal processing circuit (LCD controller, line memory, other memory, D/A converter, pulse generator, and the like) other than the foregoing circuit.

An FPC (Flexible Print Circuit) terminal as an external terminal is attached to the thus formed liquid crystal panel. In general, what is called a liquid crystal module is a liquid crystal panel in the state in which the FPC is attached.

Embodiment 3

In this embodiment, a three-plate type projector including a peripheral circuit integration type liquid crystal panel of the present invention, which includes an LCD controller and a line memory as shown in the above described embodiment 1 and is manufactured by the method of the embodiment 2, will be described.

Figure 13:
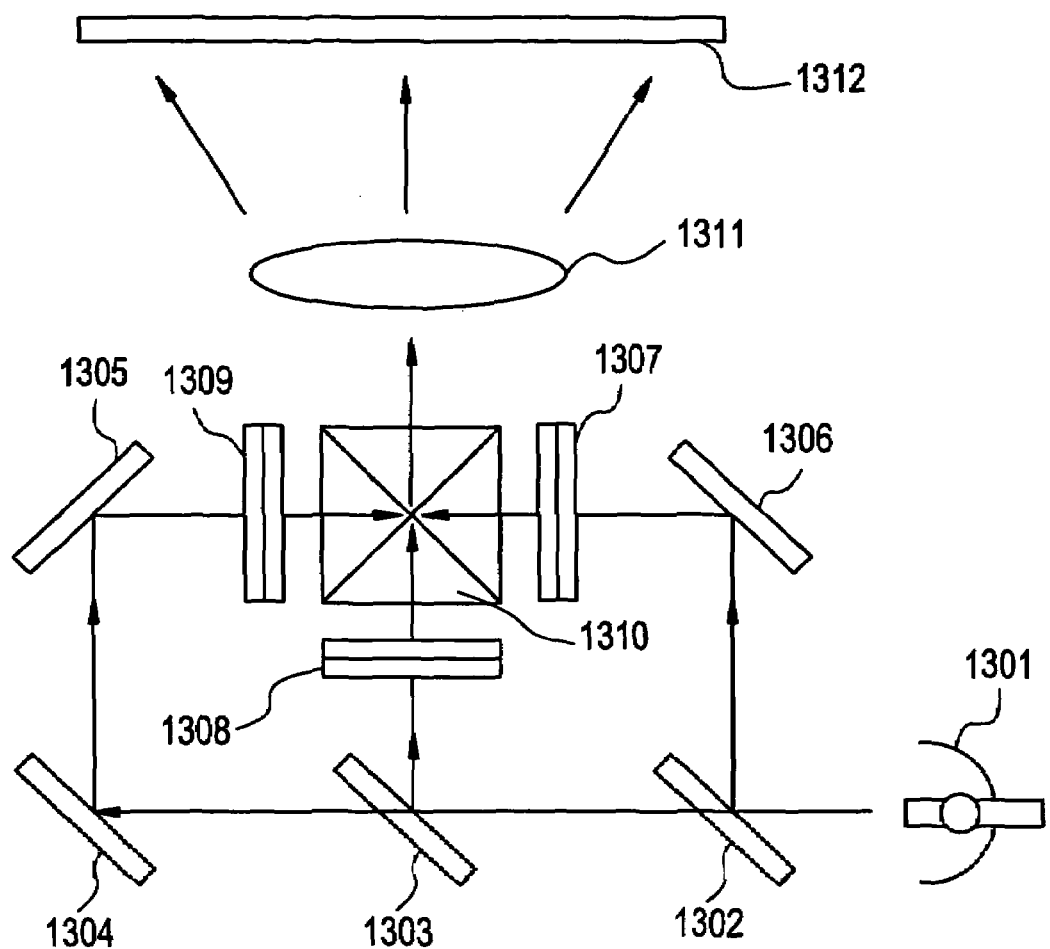
FIG. 13 is a structural view showing a three-plate type projector equipped with a liquid crystal display device of the present invention.

Reference is made to FIG. 13. Reference numeral 1301 denotes a light source, and 1302 and 1303 denote dichroic mirrors for selectively reflecting light beams of wavelength regions of R (red) and G (green), respectively. Reference numerals 1304, 1305 and 1306 denote total reflection mirrors, and 1307, 1308 and 1309 denote transmission type liquid crystal panels corresponding to R, G and B, respectively. Reference numeral 1310 denotes a dichroic prism, 1311 denotes a projection lens, and 1312 denotes a screen.

In the three-plate type liquid crystal projector of this embodiment, pictures corresponding to the three primary colors of red, blue and green are displayed on the three black-and-white display liquid crystal panels 1307, 1308 and 1309, respectively, and the foregoing liquid crystal panels are illuminated with light beams of the three primary colors corresponding thereto. Then the obtained pictures of respective primary color components are composed by the dichroic prism 1310 and are projected on the screen 1312. Thus, the three-plate type liquid crystal projector is superior in display performance (resolution, screen illumination, color purity).

Embodiment 4

In this embodiment, a single plate type projector including a peripheral circuit integration type liquid crystal panel of the present invention, which includes an LCD controller and a line memory as shown in the above described embodiment 1 and is manufactured by the method of the embodiment 2, will be described.

Figure 14:
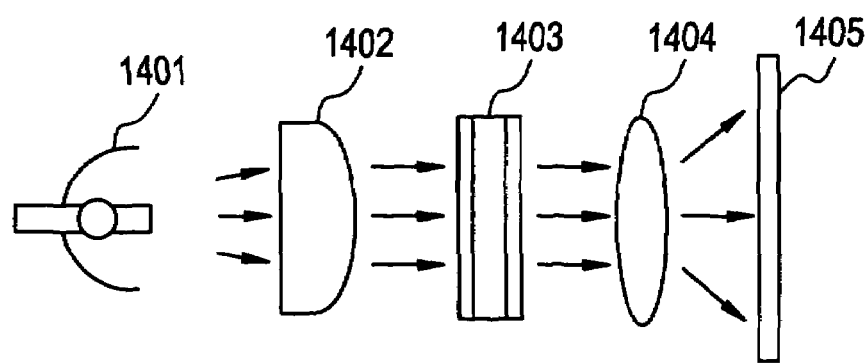
FIG. 14 is a structural view showing a single plate type projector equipped with a liquid crystal display device of the present invention.

FIG. 14 shows the structure of the single plate type liquid crystal projector of this embodiment. Reference numeral 1401 denotes a light source, 1402 denotes a condensing lens, 1403 denotes a liquid crystal panel, 1404 denotes a projection lens, and 1405 denotes a screen. A color filter is attached to the liquid crystal panel 1403.

In the single plate type liquid crystal projector of this embodiment, by using a color filter and in the same system as a direct view type liquid crystal display device, light corresponding to individual pixels, which is obtained by a method of driving the individual pixels of R, G and B, is projected on a screen.

In the single plate type liquid crystal projector, since one third of the optical parts of the three-plate type liquid crystal projector of the embodiment 3 is sufficient, it is superior in the cost and size. However, when the same liquid crystal panel is used for the three-plate type and single plate type, three colors are overlapped on one pixel in the three-plate type, while one pixel is used only as one color pixel in the single plate type, so that the single plate type is inferior to the three-plate type in picture quality. Moreover, in the foregoing single plate type liquid crystal projector, a desired color picture is obtained by absorbing unnecessary components in white light from the light source by the color filter. Thus, only one third of white light incident on the liquid crystal panel is transmitted, so that the utility efficiency of light is relatively low.

Thus, the three-plate type projector of the embodiment 3 and the single plate type projector of this embodiment may be used according to purposes.

Embodiment 5

In this embodiment, a projector (projection TV) in which a liquid crystal projector of the embodiment 3 or embodiment 4 is assembled as an optical engine, will be described.

Figure 15A:
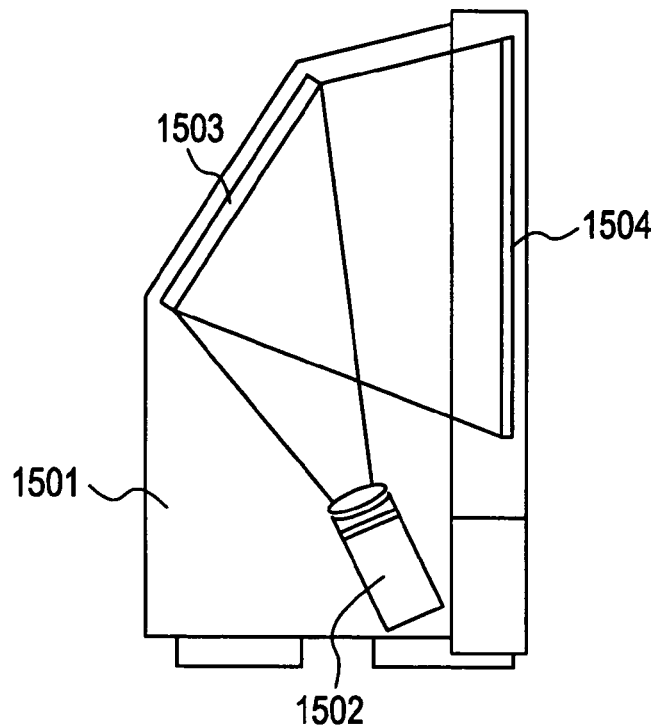
FIGS. 15A and 15B are structural views showing a rear projector equipped with a liquid crystal display device of the present invention.
Figure 15B:
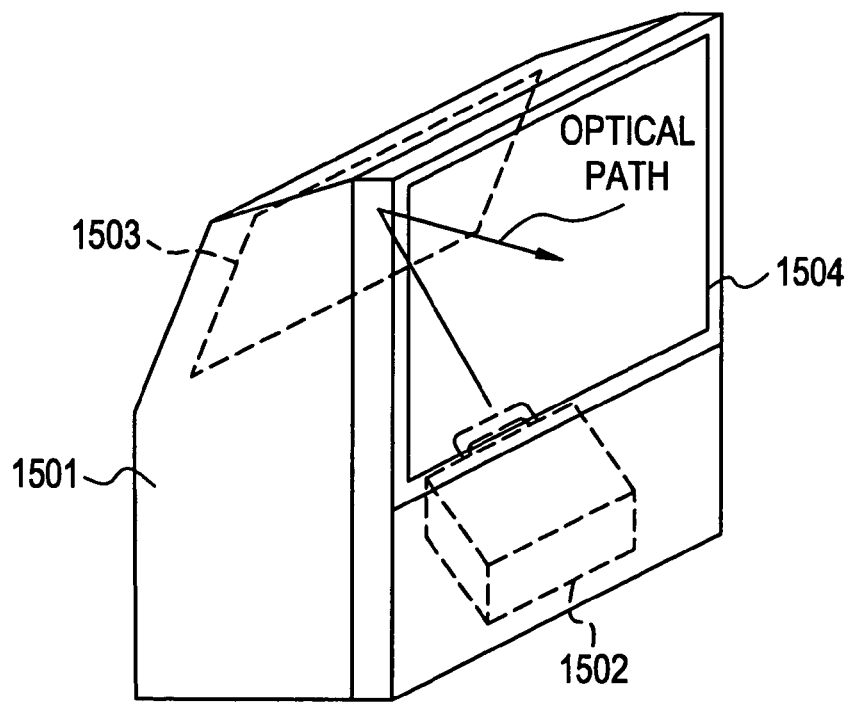

FIGS. 15A and 15B show the outside appearance of a projection TV of this embodiment. The projection TV of this embodiment is a type generally referred to as a rear type projector as well. FIG. 15A is a side view schematically showing an inside structure. FIG. 15B is a view of the projection TV of this embodiment obliquely seen.

In FIGS. 15A and 15B, 1501 denotes a main body, 1502 denotes an optical engine in which the liquid crystal projector of the embodiment 3 or embodiment 4 is incorporated, 1503 denotes a reflector, and 1504 denotes a screen. Actually, although the projection TV becomes a complicated structure by addition of other optical systems, only a schematic structure will be shown in this embodiment.

In the liquid crystal panel of the embodiment 3 or embodiment 4, a peripheral driving circuit and a logical circuit are formed integrally with a pixel region. Thus, it is possible to deal with signals of the NTSC system, PAL system, or digital system as well.

Moreover, even if a video signal corresponds to different resolution such as XGA, SXGA and UXGA, it is possible to prevent the resolution from lowering and to provide a high contrast picture by contriving such a means that black display is made for an unnecessary portion (picture non-display portion) by the logical circuit and the like.

Embodiment 6

In this embodiment, a liquid crystal projector having a structure different from the embodiment 5 will be described. The liquid crystal panel of the embodiment 2 is used also in the liquid crystal projector of this embodiment. The device shown in this embodiment is a type generally referred to as a front type projector.

Figure 16:
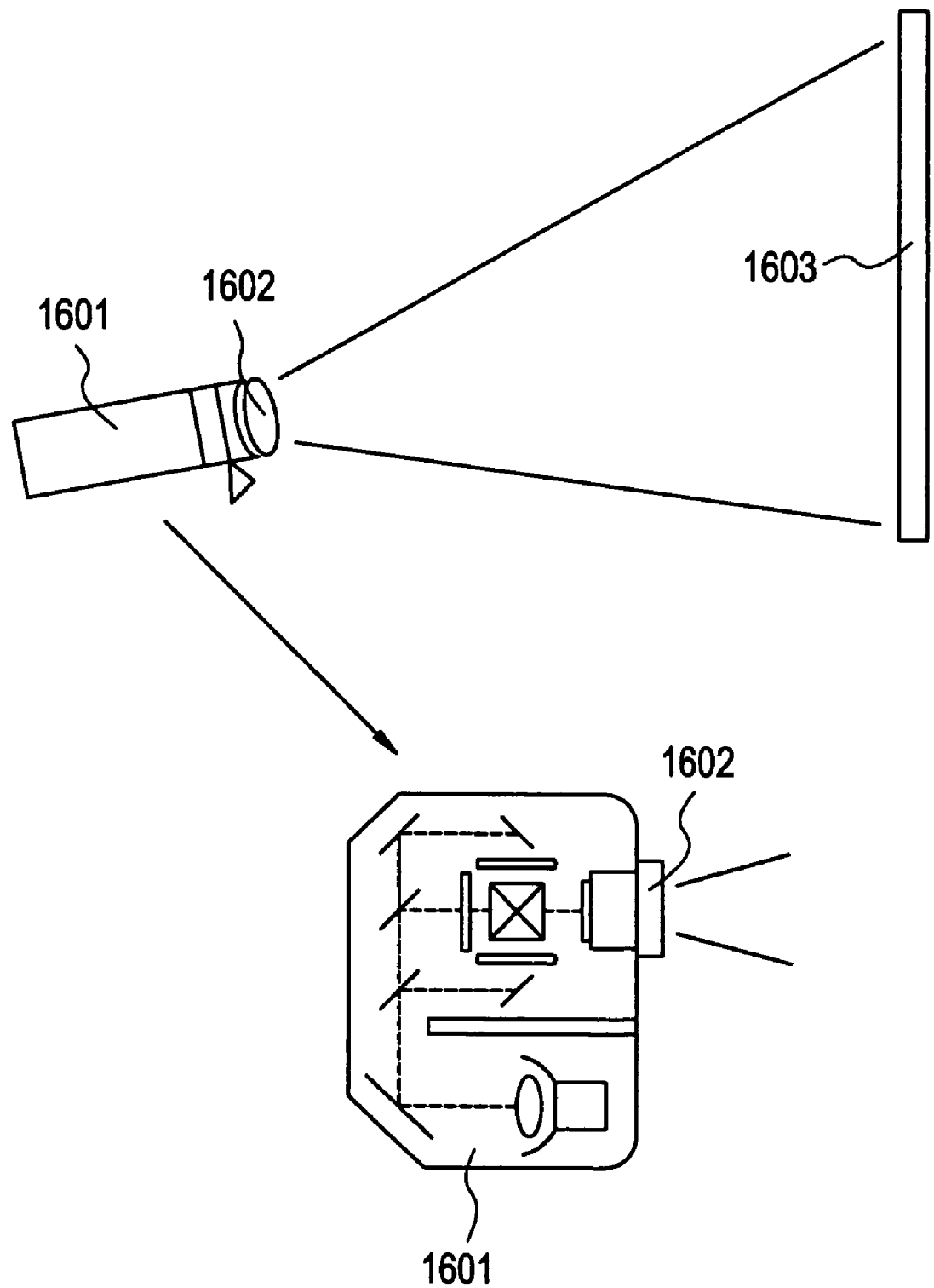
FIG. 16 is a structural view showing a front projector equipped with a liquid crystal display device of the present invention.

FIG. 16 is a structural view showing a front type projector of this embodiment. In FIG. 16, 1601 denotes a projector main body, 1602 denotes a projection lens, and 1603 denotes a screen.

The projector shown in the embodiment 3 is used as the projector main body 1601. Light containing picture information is supplied from the projector main body 1601, and a picture is projected on the screen 1603 by the projection lens 1602.

The most remarkable feature of the front type projector is that a picture is projected on a large picture screen. Thus, a demand as application for a meeting or presentation is high. A 100-inch type screen or 200-inch type screen is often used.

Also in the front type projector of this embodiment, the three-plate type projector of the embodiment 3 or the single plate type projector of the embodiment 4 may be used according to purposes.

Embodiment 7

In this embodiment, a liquid crystal display device including an LCD controller and a line memory of the present invention and using an antiferroelectric liquid crystal will be described.

The embodiment 2 will be referred to for a manufacturing method of an active matrix substrate including a pixel TFT, an LCD controller, a line memory, and a driver TFT used in this embodiment.

In the liquid crystal display device of this embodiment, the antiferroelectric liquid crystal is used. The antiferroelectric liquid crystal has two orientation states, and when a voltage is applied by a pixel TFT, liquid crystal molecules in a first or second orientation state is selectively changed into a second or first stable orientation state. The rate of liquid crystal molecules in this first or second stable orientation state can be changed by the largeness of a voltage applied. Thus, an intermediate state can be controlled by controlling an applied voltage.

Moreover, the liquid crystal display device using the antiferroelectric liquid crystal of this embodiment has a high response speed and superior frequency characteristics as compared with a liquid crystal display device of a TN mode. Thus, an excellent picture can be displayed.

The liquid crystal panel of this embodiment can also be applied to the liquid crystal projector of the embodiments 3 to 6.

Embodiment 8

In the foregoing embodiments 2 to 7, although a driver circuit of the present invention is used for a liquid crystal panel making display in an ECB (Electric field Control Birefringence) mode, the driver circuit may be used for a liquid crystal panel making display in an IPS (transverse electric field) mode in the ECB mode, or may be used for a liquid crystal panel making display in a TN (Twisted Nematic) mode, STN (Super Twisted Nematic) mode, or the like.

Moreover, although a transmission type liquid crystal panel has been described in the foregoing embodiments 2 to 7, it is needless to say that a peripheral circuit including an LCD controller, a line memory and a plurality of source line side drivers may be used for a reflection type liquid crystal panel.

Moreover, although a case where a liquid crystal is used as a display medium has been described, the driving circuit of the present invention can also be used for a liquid crystal display device using a mixing layer of liquid crystals and polymers, that is, a so-called polymer dispersion type liquid crystal display device. Further, the driving circuit of the present invention may be used for a display device including any other display medium as long as its optical characteristics can be modulated in response to an applied voltage. For example, an electroluminescence element or the like may be used as a display medium.

According to the present invention, in a picture display device, especially in an active matrix type display device, even if a substantial operation speed, clock frequency or the like of a source line side driver is not changed, picture display at a speed higher than the prior art can be made, so that high resolution, large screen, and high speed display requiring a large amount of picture data can be realized easily and inexpensively.

What is claimed is:

1. A projection TV comprising:
    an optical engine;
    a reflector;
    a screen:
    a gate line side driver connected to at least a first gate line and a second gate line;
    first 2m pixels connected to said first gate line;
    second 2m pixels connected to said second gate line;
    a first source line side driver connected to first to m-th source lines;
    a second source line side driver connected to (m+1)-th to 2m-th source lines;
    a first line memory comprising a first memory and a second memory; and
    a second line memory comprising a third memory and a fourth memory,
    wherein said first line memory is in a writing mode to store transmitted first to 2m-th signals for said first 2m pixels when said second line memory is in a reading mode to transmit stored first to 2m-th signals for said second 2m pixels,
    wherein said second memory stores said transmitted (m+1)-th to 2m-th signals after said first memory stores said transmitted first to m-th signals in said writing mode,
    wherein said third memory transmits said stored first signal and said fourth memory transmits said stored (m+1)-th signal simultaneously, and said third memory and said fourth memory sequentially transmit said stored first to m-th signals and said stored (m+1)-th to 2m-th signals, respectively, simultaneously.

2. A projection TV according to claim 1 wherein at least one of said first memory, said second memory, said third memory and said fourth memory comprises a memory selected from the group consisting of DRAM, VRAM and SRAM.

3. A projection TV according to claim 1 wherein a first clock frequency in said writing mode is twice a second clock frequency in said reading mode.

4. A projection TV comprising:
    an optical engine;
    a reflector;
    a screen:
    a gate line side driver connected to at least a first gate line and a second gate line;
    first m pixels connected to said first gate line;
    second m pixels connected to said second gate line;
    first to n-th source line side drivers, each said first to n-th source line side drivers connected to m/n source lines;
    a first line memory comprising first to n-th memories; and
    a second line memory comprising (n+1)-th to 2n-th memories,
    wherein said first line memory is in a writing mode to store transmitted first to m-th signals for said first m pixels when said second line memory is in a reading mode to transmit stored first to m-th signals for said second m pixels;
    wherein said first to n-th memories store said transmitted first to m-th signals sequentially in said writing mode; and
    wherein said (n+1)-th to 2n-th memories simultaneously transmit said stored first to m-th signals in said reading mode;
    wherein said (n+1)-th memory transmits said stored first signal and said (n+2)-th memory transmits said stored (m/n+1)-th signal simultaneously, and said (n+1)-th memory and said (n+2)-th memory sequentially transmit said stored first to m/n-th signals and said stored (m/n+1)-th to 2m/n-th signals, respectively, simultaneously.

5. A projection TV according to claim 4 wherein at least one of said first to n-th memories and said (n+1)-th to 2n-th memories comprises a memory selected from the group consisting of DRAM, VRAM and SRAM.

6. A projection TV according to claim 4 wherein a first clock frequency in said writing mode is n times a second clock frequency in said reading mode.

7. A projection TV comprising:
    an optical engine;
    a reflector;
    a screen:
    a first source line side driver connected to first to m-th source lines;
    a second source line side driver connected to (m+1)-th to 2m-th source lines;
    a first line memory comprising a first memory and a second memory; and a second line memory comprising a third memory and a fourth memory,
wherein said first line memory is in a writing mode to store transmitted first to 2m-th signals when said second line memory is in a reading mode to transmit stored first to 2m-th signals,
wherein said second memory stores said transmitted (m+1)-th to 2m-th signals after said first memory stores said transmitted first to m-th signals in said writing mode,
wherein said third memory transmits said stored first signal and said fourth memory transmits said stored (m+1)-th signal simultaneously, and said third memory and said fourth memory sequentially transmit said stored first to m-th signals and said stored (m+1)-th to 2m-th signals, respectively, simultaneously.

8. A projection TV according to claim 7, wherein at least one of said first memory, said second memory, said third memory and said fourth memory comprises a memory selected from the group consisting of DRAM, VRAM and SRAM.

9. A projection TV comprising:
an optical engine;
a reflector;
a screen:
first to n-th source line side drivers, each said first to n-th source line side drivers connected to m/n source lines;
a first line memory comprising first to n-th memories; and
a second line memory comprising (n+1)-th to 2n-th memories,
wherein said first line memory is in a writing mode to store transmitted first to m-th signals when said second line memory is in a reading mode to transmit stored first to m-th signals;
wherein said first to n-th memories store said transmitted first to m-th signals sequentially in said writing mode; and
wherein said (n+1)-th to 2n-th memories simultaneously transmit said stored first to m-th signals in said reading mode;
wherein said (n+1)-th memory transmits said stored first signal and said (n+2)-th memory transmits said stored (m/n+1)-th signal simultaneously, and said (n+1)-th memory and said (n+2)-th memory sequentially transmit said stored first to m/n-th signals and said stored (m/n+1)-th to 2m/n-th signals, respectively, simultaneously.

10. A projection TV according to claim 9, wherein at least one of said first to n-th memories and said (n+1)-th to 2n-th memories comprises a memory selected from the group consisting of DRAM, VRAM and SRAM.

11. A front type projector comprising:
a projection lens;
a screen:
a gate line side driver connected to at least a first gate line and a second gate line;
first 2m pixels connected to said first gate line;
second 2m pixels connected to said second gate line;
a first source line side driver connected to first to m-th source lines;
a second source line side driver connected to (m+1)-th to 2m-th source lines;
a first line memory comprising a first memory and a second memory; and
a second line memory comprising a third memory and a fourth memory,
wherein said first line memory is in a writing mode to store transmitted first to 2m-th signals for said first 2m pixels when said second line memory is in a reading mode to transmit stored first to 2m-th signals for said second 2m pixels,
wherein said second memory stores said transmitted (m+1)-th to 2m-th signals after said first memory stores said transmitted first to m-th signals in said writing mode,
wherein said third memory transmits said stored first signal and said fourth memory transmits said stored (m+1)-th signal simultaneously, and said third memory and said fourth memory sequentially transmit said stored first to m-th signals and said stored (m+1)-th to 2m-th signals, respectively, simultaneously.

12. A front type projector according to claim 11 wherein at least one of said first memory, said second memory, said third memory and said fourth memory comprises a memory selected from the group consisting of DRAM, VRAM and SRAM.

13. A front type projector according to claim 11 wherein a first clock frequency in said writing mode is twice a second clock frequency in said reading mode.

14. A front type projector comprising:
a projection lens;
a screen:
a gate line side driver connected to at least a first gate line and a second gate line;
first m pixels connected to said first gate line;
second m pixels connected to said second gate line;
first to n-th source line side drivers, each said first to n-th source line side drivers connected to m/n source lines;
a first line memory comprising first to n-th memories; and
a second line memory comprising (n+1)-th to 2n-th memories,
wherein said first line memory is in a writing mode to store transmitted first to m-th signals for said first m pixels when said second line memory is in a reading mode to transmit stored first to m-th signals for said second m pixels;
wherein said first to n-th memories store said transmitted first to m-th signals sequentially in said writing mode; and
wherein said (n+1)-th to 2n-th memories simultaneously transmit said stored first to m-th signals in said reading mode;
wherein said (n+1)-th memory transmits said stored first signal and said (n+2)-th memory transmits said stored (m/n+1)-th signal simultaneously, and said (n+1)-th memory and said (n+2)-th memory sequentially transmit said stored first to m/n-th signals and said stored (m/n+1)-th to 2m/n-th signals, respectively, simultaneously.

15. A front type projector according to claim 14 wherein at least one of said first to n-th memories and said (n+1)-th to 2n-th memories comprises a memory selected from the group consisting of DRAM, VRAM and SRAM.

16. A front type projector according to claim 14 wherein a first clock frequency in said writing mode is n times a second clock frequency in said reading mode.

17. A front type projector comprising:
a projection lens;
a screen:
a first source line side driver connected to first to m-th source lines;
a second source line side driver connected to (m+1)-th to 2m-th source lines;

a first line memory comprising a first memory and a second memory; and a second line memory comprising a third memory and a fourth memory, wherein said first line memory is in a writing mode to store transmitted first to 2m-th signals when said second line memory is in a reading mode to transmit stored first to 2m-th signals, wherein said second memory stores said transmitted (m+1)-th to 2m-th signals after said first memory stores said transmitted first to m-th signals in said writing mode, wherein said third memory transmits said stored first signal and said fourth memory transmits said stored (m+1)-th signal simultaneously, and said third memory and said fourth memory sequentially transmit said stored first to m-th signals and said stored (m+1)-th to 2m-th signals, respectively, simultaneously.

18. A front type projector according to claim 17, wherein at least one of said first memory, said second memory, said third memory and said fourth memory comprises a memory selected from the group consisting of DRAM, VRAM and SRAM.

19. A front type projector comprising:

a projection lens:

a screen:

first to n-th source line side drivers, each said first to n-th source line side drivers connected to m/n source lines;

a first line memory comprising first to n-th memories; and a second line memory comprising (n+1)-th to 2n-th memories, wherein said first line memory is in a writing mode to store transmitted first to m-th signals when said second line memory is in a reading mode to transmit stored first to m-th signals;

wherein said first to n-th memories store said transmitted first to m-th signals sequentially in said writing mode; and wherein said (n+1)-th to 2n-th memories simultaneously transmit said stored first to m-th signals in said reading mode;

wherein said (n+1)-th memory transmits said stored first signal and said (n+2)-th memory transmits said stored (m/n+1)-th signal simultaneously, and said (n+1)-th memory and said (n+2)-th memory sequentially transmit said stored first to m/n-th signals and said stored (m/n+1)-th to 2m/n-th signals, respectively, simultaneously.

20. A front type projector according to claim 19, wherein at least one of said first to n-th memories and said (n+1)-th to 2n-th memories comprises a memory selected from the group consisting of DRAM, VRAM and SRAM.

* * * * *